United States Patent
Rossato et al.

(10) Patent No.: US 9,621,887 B2
(45) Date of Patent: Apr. 11, 2017

(54) MOTION COMPENSATION AND MOTION ESTIMATION LEVERAGING A CONTINUOUS COORDINATE SYSTEM

(71) Applicants: Luca Rossato, Milan (IT); Guido Meardi, Milan (IT)

(72) Inventors: Luca Rossato, Milan (IT); Guido Meardi, Milan (IT)

(73) Assignee: V-NOVA INTERNATIONAL LIMITED, London (GB)

( * ) Notice: Subject to any disclaimer, the term of this patent is extended or adjusted under 35 U.S.C. 154(b) by 594 days.

(21) Appl. No.: 13/893,677

(22) Filed: May 14, 2013

(65) Prior Publication Data
US 2013/0321423 A1  Dec. 5, 2013

Related U.S. Application Data

(60) Provisional application No. 61/646,797, filed on May 14, 2012, provisional application No. 61/647,426, filed on May 15, 2012.

(51) Int. Cl.
| | |
|---|---|
| *H04N 19/00* | (2014.01) |
| *G06T 7/20* | (2006.01) |
| *H04N 19/63* | (2014.01) |
| *H04N 19/50* | (2014.01) |
| *H04N 19/62* | (2014.01) |
| *H04N 19/23* | (2014.01) |

(Continued)

(52) U.S. Cl.
CPC ....... *H04N 19/00569* (2013.01); *G06T 7/204* (2013.01); *H04N 19/23* (2014.11); *H04N 19/33* (2014.11); *H04N 19/62* (2014.11); *H04N 19/63* (2014.11); *H04N 19/87* (2014.11); *H04N 19/126* (2014.11); *H04N 19/59* (2014.11); *H04N 19/635* (2014.11); *H04N 19/94* (2014.11)

(58) Field of Classification Search
None
See application file for complete search history.

(56) References Cited

U.S. PATENT DOCUMENTS

2010/0188535 A1* 7/2010 Mitsuya ............. G06T 5/50
                                                          348/241
2011/0142132 A1   6/2011 Tourapis et al.

OTHER PUBLICATIONS

Jahne, Bernd. Digital Image Processing. Springer Sceince & Business Media, 2005, selected pp. 277and 278.*

(Continued)

*Primary Examiner* — Zhengxi Liu
(74) *Attorney, Agent, or Firm* — Chapin Intellectual Property Law, LLC

(57) ABSTRACT

Computer processor hardware receives settings information for a first image. The first image includes a set of multiple display elements. The computer processor hardware receives motion compensation information for a given display element in a second image to be created based at least in part on the first image. The motion compensation information indicates a coordinate location within a particular display element in the first image to which the given display element pertains. The computer processor hardware utilizes the coordinate location as a basis from which to select a grouping of multiple display elements in the first image. The computer processor hardware then generates a setting for the given display element in the second image based on settings of the multiple display elements in the grouping.

47 Claims, 11 Drawing Sheets

(51) Int. Cl.
*H04N 19/33* (2014.01)
*H04N 19/87* (2014.01)
*H04N 19/126* (2014.01)
*H04N 19/635* (2014.01)
*H04N 19/94* (2014.01)
*H04N 19/59* (2014.01)

(56) References Cited

OTHER PUBLICATIONS

Pieters, Bart et al., "Motion Compensation and Reconstruction of H.264/AVC Video Bitstreams Using the GPU", Eighth International Workshop on Image Analysis for Multimedia Interactive Services, Jun. 2007, Total pp. 4 (pp. 1-4) IEEE, New York.
Zavacky, Jozef et al., "Resampling of an Image by Block-Based Interpolation or Decimation With Compensation", Jun. 2000, Total pp. 7 (pp. 18-24), vol. 9 No. 2, Radioengineering, Slovak Republic.
Ribas-Corbera Jordi et al., "Optimizing Block Size in Motion-Compensated Video Coding", Journal of Electronic Imaging, Jan. 1998, Total pp. 11 (pp. 155-165), vol. 7 No. 1, SPIE and IS&T, USA.
Lee, Ming-Chieh et al., "A Layered Video Object Coding System Using Sprite and Affine Motion Model", IEEE Transactions on Circuits and Systems for Video Technology, Feb. 1997, Total pp. 16 (pp. 130-145), vol. 7 No. 1, IEEE, New York.
Lakshman, Haricharan et al., "Generalized Interpolation for Motion Compensated Prediction", IEEE International Conference on Image Processing, Sep. 2011, Total pp. 4 (pp. 1213-1216), IEEE, New York.
Wang, Wei-Dong et al., "Fast Algorithm of Arbitrary Fractional-Pixel Accuracy Motion Estimation", Visual Communications and Image Processing, Jan. 2002, Total pp. 8 (pp. 1061-1068), vol. 4671, SPIE, USA.
Ebrahimi, Touradj et al., "MPEG-4 Natural Video Coding13 An Overview", Signal Processing: Image Communication, Jan. 2000, Total pp. 21 (pp. 365-385), vol. 15, Elsevier Science, USA.
Panusopone, Krit et al., "An Efficient Implementation of Unrestricted Motion Compensation in Video Encoder", IEEE International Conference on Acoustics, Speech, and Signal Processing, Apr. 2007, Total pp. 4 (pp. 1005-1008), IEEE, New York.
Nicolas, H. et al., "Motion and Illumination Variation Estimation Using a Hierarchy of Models: Application to Image Sequence Coding", Journal of Visual Communication and Image Representation, Dec. 1995, Total pp. 14 (pp. 303-316), Academic Press, Inc., USA.
Lou, Ming et al., "A Spatial Constrained K-Means Approach to Image Segmentation", International Conference on Information, Communications and Signal Processing, Dec. 15-18, 2003, Total pp. 5 (pp. 738-742), IEEE, New York.
Irani, Michal et al., "Video Compression Using Mosaic Representations", Signal Processing: Image Communication, Nov. 1995, Total pp. 24 (pp. 529-552), vol. 7, Elsevier Science, USA.
International Search Report from corresponding PCT application No. PCT/EP20123/059886, mailed Oct. 24, 2013, total pp. 10.
Athanasios Leontaris, et al., "Multiple reference motion compensation: a tutorial introduction and survey. Foundations and Trends in Signal Processing", Aug. 31, 2009, vol. 2, No. 4, pp. 247-364.
Search Report, Application No. 11201407472S, Nov. 2, 2015, pp. 2.

* cited by examiner

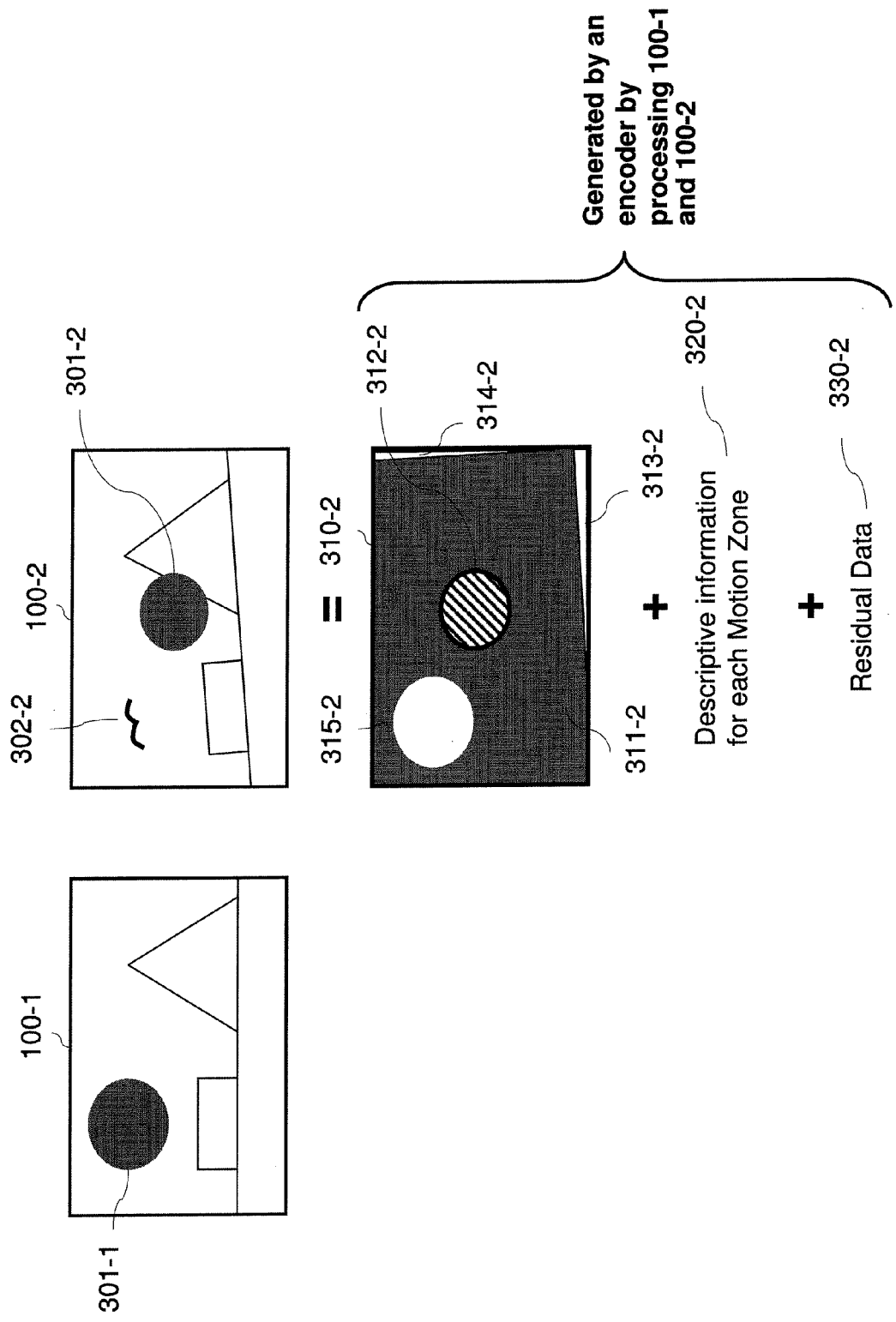

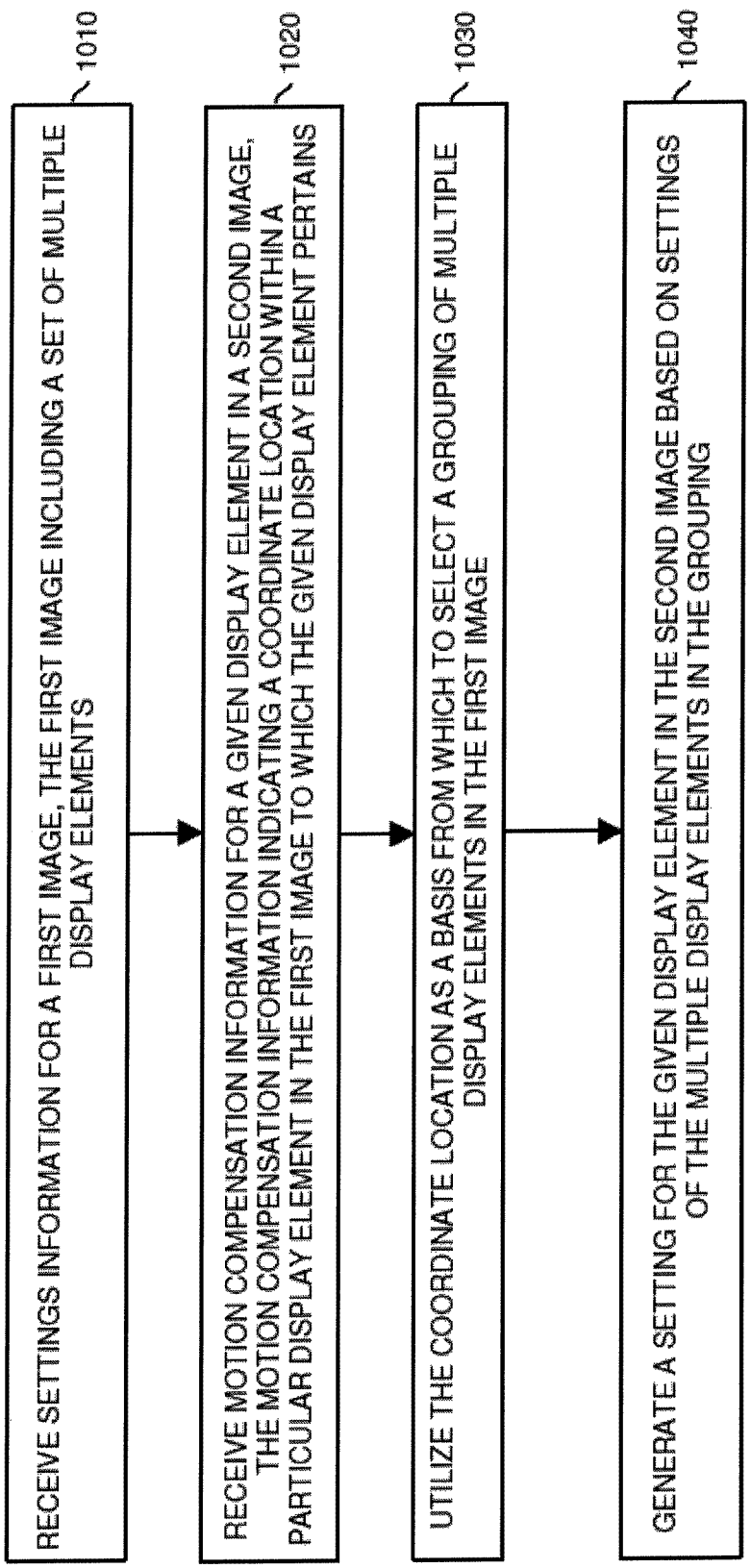

MOTION COMPENSATION AND MOTION ESTIMATION LEVERAGING A CONTINUOUS COORDINATE SYSTEM

RELATED APPLICATIONS

This application is related and claims the benefit of U.S. Provisional Patent Application Ser. No. 61/646,797 entitled "SIGNAL ENCODING, DECODING AND RECONSTRUCTION OF TIME-BASED AND/OR MULTIDIMENSIONAL SIGNALS BASED ON MULTIDIMENSIONAL TIER-BASED INHERITANCE", filed on May 14, 2012, the entire teachings of which are incorporated herein by this reference.

This application is related to and claims the benefit of U.S. Provisional Patent Application Ser. No. 61/647,426 entitled "ESTIMATION, ENCODING, DECODING AND USAGE OF MOTION INFORMATION IN MULTIDIMENSIONAL SIGNALS THROUGH MOTION ZONES, MOTION MATRIXES, WARP MAPS AND MOTION TRANSFORMS", filed on May 15, 2012, the entire teachings of which are incorporated herein by this reference.

This application is also related to U.S. patent application Ser. No. 13/188,188 entitled "INHERITANCE IN A TIERED SIGNAL QUALITY HIERARCHY," filed on Jul. 21, 2011, the entire teachings of which are incorporated herein by this reference.

This application is related to U.S. patent application Ser. No. 13/188,201 entitled "TIERED SIGNAL DECODING AND SIGNAL RECONSTRUCTION," filed on Jul. 21, 2011, the entire teachings of which are incorporated herein by this reference.

This application is related to U.S. patent application Ser. No. 13/188,207 entitled "SIGNAL PROCESSING AND TIERED SIGNAL ENCODING," filed on Jul. 21, 2011, the entire teachings of which are incorporated herein by this reference.

This application is related to U.S. patent application Ser. No. 13/188,220 entitled "UPSAMPLING IN A TIERED SIGNAL QUALITY HIERARCHY," filed on Jul. 21, 2011, the entire teachings of which are incorporated herein by this reference.

This application is related to U.S. patent application Ser. No. 13/188,226 entitled "SIGNAL PROCESSING AND INHERITANCE IN A TIERED SIGNAL QUALITY HIERARCHY," filed on Jul. 21, 2011, the entire teachings of which are incorporated herein by this reference.

This application is related to U.S. patent application Ser. No. 13/352,944 entitled "SIGNAL ANALYSIS AND GENERATION OF TRANSIENT INFORMATION," filed on Jan. 18, 2012, the entire teachings of which are incorporated herein by this reference.

This application is related to U.S. Provisional Patent Application Ser. No. 61/563,169 entitled "TIER-BASED SYSTEM TO SEPARATE A MULTIDIMENSIONAL SIGNAL INTO STABLE/PREDICTABLE INFORMATION AND TRANSIENT INFORMATION," filed on Nov. 23, 2011, the entire teachings of which are incorporated herein by this reference.

This application is related to U.S. patent application Ser. No. 13/188,237 entitled "TRANSMISSION OF RECONSTRUCTION DATA IN A TIERED SIGNAL HIERARCHY," filed on Jul. 21, 2011, the entire teachings of which are incorporated herein by this reference.

This application is related to U.S. Provisional Patent Application Ser. No. 61/558,302 entitled "UPSAMPLING AND DOWNSAMPLING OF MOTION MAPS AND OTHER AUXILIARY MAPS IN A TIERED SIGNAL QUALITY HIERARCHY," filed on Nov. 10, 2011, the entire teachings of which are incorporated herein by this reference.

This application is related to U.S. patent application Ser. No. 13/303,554 entitled "UPSAMPLING AND DOWNSAMPLING OF MOTION MAPS AND OTHER AUXILIARY MAPS IN A TIERED SIGNAL QUALITY HIERARCHY," filed on Nov. 23, 2011, the entire teachings of which are incorporated herein by this reference.

This application is related to U.S. Provisional Patent Application Ser. No. 61/587,989 entitled "DISTINCT ENCODING/DECODING OF STABLE/PREDICTABLE INFORMATION AND TRANSIENT/STOCHASTIC INFORMATION," filed on Jan. 18, 2012, the entire teachings of which are incorporated herein by this reference.

This application is related to U.S. patent application Ser. No. 13/744,808 entitled "DISTINCT ENCODING AND DECODING OF STABLE INFORMATION AND TRANSIENT/STOCHASTIC INFORMATION", filed on Jan. 18, 2013, the entire teachings of which are incorporated herein by this reference.

BACKGROUND

Many techniques are known in the art to deal with compression and decompression of multidimensional signals or of signals evolving along time. This is the case of audio signals, video signals and other multidimensional signals like volumetric signals used in scientific and medical areas.

In order to achieve high compression ratios, those techniques exploit the spatial and time correlation inside the signal. Conventional methods identify a reference and try to determine the difference of the signal between a current location and the given reference. This is done both in the spatial domain, where the reference is a portion of already received and decoded spatial plane, and in the time domain, where a single instance in time of the signal (e.g., a video frame in a sequence of frames) is taken as a reference for a certain duration. This is the case, for example, of MPEG-family compression algorithms, where previously-decoded macro blocks are taken as reference in the spatial domain and I-frames and P-frames are used as reference for subsequent P-frames in the time domain.

Known techniques exploit spatial correlation and time correlation in many ways, adopting several different techniques in order to identify, simplify, encode and transmit differences. In accordance with conventional methods, in order to leverage on spatial correlation a domain transformation is performed (for example into a frequency domain) and then lossy deletion and quantization of information is performed. In the time domain, instead, conventional methods transmit the quantized difference between the current sample and a motion-compensated reference sample.

In order to maximize the similarity between samples, encoders try to estimate the modifications along time occurred vs. the reference signal. This is called, in conventional encoding methods (e.g., MPEG family technologies, VP8, etc.), motion estimation and compensation.

Motion information is transmitted to the decoder in order to enable reconstruction of the current sample by leveraging information already available at the decoder for the reference sample: in state-of-the-art methods this is done using motion vectors at a macro block basis. In other words, a motion vector can indicate motion at a block level including multiple display elements.

Traditionally, motion information has been represented by means of offset motion vectors, i.e., vectors indicating the position of a similar portion of a picture (e.g., a block of plane elements, or "pels", often called picture elements or "pixels" for the case of 2D images) in a reference picture. For example, as discussed above, using block motion compensation (BMC), the images of a video sequence can be partitioned into blocks of pixels. Each block B in a current image can be predicted based on a block $B_0$ of equal size in a reference frame. The position of the block $B_0$ in the reference image with respect to the position of B in the current image can be encoded as an offset motion vector. In such cases, the motion vector indicates the opposite of the estimated x and y movement of the block of pixels (in particular, it indicates the opposite of the movement since it points from B to $B_0$, while the movement is from $B_0$ to B).

A motion vector is typically encoded with sub pixel precision (i.e., can specify movements also of fractions of a pixel) because the encoder wants to be able to capture also subtle movements of less than a full pixel. According to MPEG family codecs, the blocks are not transformed other than being shifted to the position of the predicted block, and additional information must be encoded through residual data indicating differences between block $B_0$ and block B.

Motion estimation is typically referred to as the process of determining motion vectors that suitably describe the transformation from one picture to another, usually from adjacent frames in a video sequence. Motion estimation is typically based on an assumption that image values (brightness, color, etc., expressed in a suitable color space) remain constant over time, though their position in the image may change. The underlying assumption of motion estimation through motion vectors is that the possible movements of the portion of the image identified by the motion vector (e.g., macroblock) are limited to translational movements.

In state of the art technologies, coordinates of motion vectors associated to either a pel or a group of pels are expressed based on a discrete coordinate system (i.e., with a finite set of symbols), either possessing step width of the same resolution as the current image ("pel resolution", i.e., current image and reference image have the same resolution) or possessing sub-pel resolutions (e.g., by way of non-limiting examples, $\frac{1}{4}^{th}$ of a pel, $\frac{1}{8}^{th}$ of a pel, etc.). In this last case, the reference image has a higher resolution than the current image, in order to allow a motion vector to point to a given position with sub-pixel resolution (with respect to the resolution of the current image); essentially, the reference image is supersampled with a given scale factor, and the coordinates of motion vectors are expressed with integer numbers in the coordinate system of the supersampled reference image. In other words, even though a display does not have the ability to display such a high resolution, a supersampled (high-resolution) rendition of an image is produced for a given reference image, just to support motion compensation operations. Motion vectors can be used to identify which portion of the rendition of the image is to be used to reconstruct a display signal.

Leveraging motion vectors with sub-pel resolution allows for better precision in motion estimation and in motion compensation, but also implies the significant disadvantage of requiring a higher amount of memory at the decoder side, since the buffer that stores the "super high resolution" of the reference image needs to store a much higher number of pels than the number that it is necessary to display on a respective display screen.

Known encoding techniques based on block motion compensation and on offset motion vectors using integer coordinates (i.e., coordinates with fixed precision, such as $\frac{1}{8}^{th}$ of a pixel) have several important drawbacks, suitably addressed by novel methods described herein. Most notably, the use of offset coordinates with a given sub-pixel precision typically requires to buffer an upsampled rendition of the reference image at the given sub-pixel resolution: as a consequence, capturing very subtle movements (e.g., $\frac{1}{128}$ of a pixel, important for instance in the case of high frame-rate video signals or in the case of complex movements such as a 1% zoom with 2-degree rotation) is not feasible due to memory limitations and to the high amount of computations that would be necessary to calculate the supersampled reference image. Generation and processing of a super high-resolution reference image is undesirable for a number of reasons.

BRIEF DESCRIPTION

Embodiments herein deviate with respect to conventional systems and methods, providing novel methods to estimate, encode and leverage motion information so as to generate a suitable prediction of a current image (or "target image") based on motion compensation of a reference image, hence supporting methods such as motion estimation, motion compensation, signal encoding, signal quality enhancement (e.g., denoising, super-resolution, etc.), signal interpolation (e.g., increase of frame-rate), special effects, computer graphics, medical imaging, computer vision, augmented reality applications, etc.

One embodiment herein includes a method for calculating or predicting the value of an element of a target image based on the value of an arbitrary location of a reference image, whereby such arbitrary location is expressed with fractional coordinates (such as floating point numbers, high-precision fixed-point numbers, real numbers, non-integer numbers, etc.) independent of the actual sample grid (i.e., resolution) of the reference image used as a basis to reconstruct a rendition of the image. In contrast to pre-calculating and producing a supersampled reference image at a higher resolution and then performing motion compensation by means of an integer coordinate system based on the supersampled grid, certain embodiments illustrated herein do not need to pre-calculate any supersampled rendition of the reference image and instead calculate reference elements on-the-fly at any arbitrary location in the reference image (e.g., without limitation, via on-the-fly resampling techniques).

According to embodiments herein, motion compensation can be effectively implemented using a substantially continuous coordinate system and effectively supporting motion compensation of very subtle movements (e.g., if necessary, even smaller than $\frac{1}{10}^{th}$ of a pel) with relatively limited buffer memory cost and computational cost. Essentially, motion compensation according to embodiments herein allows for extremely high precision (e.g., capturing movements of less than $\frac{1}{100}^{th}$ of a pel) and may leverage resampling operations performed on the fly, without the need of storing large reference images at higher resolutions.

Embodiments herein may be useful in conjunction with traditional motion compensation approaches, and may be even more useful in conjunction with motion zones and motion matrixes (as opposed to block motion compensation with offset motion vectors), as described in related applications.

For simplicity, non-limiting embodiments illustrated herein refer to a signal as a sequence of multi-dimensional samples (i.e., sets of one or more elements organized as arrays with one or more dimensions, e.g., by way of non-limiting example sets of picture elements organized as two-dimensional images) occurring at a given sample rate along the time dimension. In the description the terms "image" or "plane" (intended with the broadest meaning of "hyperplane", i.e., array of elements with any number of dimensions and a given sampling grid) will be often used to identify the digital rendition of a sample of the signal along the sequence of samples, wherein each plane has a given resolution for each of its dimensions (e.g., X and Y), and comprises a set of plane elements (or "element", or "pel", for two-dimensional images often called "pixel", for volumetric images often called "voxel", etc.) characterized by one or more "values" or "settings" (e.g., by ways of non-limiting examples, color settings in a suitable color space, settings indicating density level, settings indicating temperature levels, settings indicating audio pitch, settings indicating amplitude, etc.). Each plane element is identified by a suitable set of coordinates, indicating the integer positions of the element in the sampling grid of the image.

As non-limiting examples, a signal can be an image, an audio signal, a multichannel audio signal, a video signal, a multi-view video signal (e.g., 3D video), a volumetric signal (e.g., medical imaging, scientific imaging, holographic imaging, etc.), a volumetric video signal, or even signals with more than four dimensions.

Embodiments illustrated herein will be particularly focused on signals evolving over time and featuring some degree of motion from one sample to the next, i.e., samples are time correlated. Also very high sample rates (e.g., also over 1,000 images per second, the motion of which is typically badly described by conventional motion estimation and compensation methods) are easily addressed by the described embodiments.

For simplicity, non-limiting embodiments illustrated herein often refer to signals that are displayed as sequences of 2D planes of settings (e.g., 2D images in a suitable color space), such as for instance a video signal. However, people skilled in the art can easily understand that the same concepts and methods are also applicable to any other types of time-based signal (e.g., multi-view video signals, 3D video signals, sequences of 3D volumetric signals, etc.), and also to non-time-based multi-dimensional signals (e.g., sequences of audio channels of a same audio signal, two-dimensional pictures, volumetric/holographic images, plenoptic images, etc.). As a non-limiting example of a non-time-based signal that can benefit of novel compensation methods described herein, a series of two-dimensional slices of a CAT-scan or an MRI (i.e., a non-time-based three-dimensional signal) can be suitably represented as a series of two-dimensional samples along a dimension (i.e., the axis along which the slices were taken), and processed according to methods illustrated herein, as if the axis along which the slices were taken was a time dimension (by assuming either a constant sample rate or even a variable sample rate).

In a non-limiting embodiment described herein, a signal processor is configured to calculate ("predict") compensated settings for elements of an image ("destination image", or "compensated image") leveraging on-the-fly resampling operations in order to access any arbitrary position ($x^1$, $y^1$) of a reference image, regardless of the actual resolution (i.e., sampling grid) of the reference image. In this way, it is possible to leverage on a coordinate system where each coordinate is expressed with arbitrary precision (e.g., without limitation, even by a floating point number or a high precision fixed-point number, as opposed to an integer number in the coordinate system of the reference image), so that the resolution of the reference image is treated as essentially infinite/continuous ("continuous coordinates", or "fractional coordinates"). As already mentioned, this approach is extremely innovative since state-of-the-art encoding and decoding techniques have been based so far on the assumption that the reconstructed signal and reference signals have a finite resolution, with each coordinate indicating an element comprised in a discrete grid/set of elements.

In a non-limiting embodiment, on-the-fly resampling operations are performed by selecting a set of elements of the reference image belonging to the sampling grid of the reference image and close to the arbitrary position indicated by the fractional coordinates of the motion vector. According to the chosen resampling method (e.g., by way of non-limiting example, bicubic resampling), the signal processor selects an appropriate number of elements (e.g., without limitation, the 16 elements with the closest center to the arbitrary location, or fewer elements if the arbitrary location is close to the borders of the reference image) and calculates the weights to apply to each element. Lastly, the signal processor calculates the sampling value to assign to the arbitrary position by performing a weighted average of the selected elements.

Some non-limiting embodiments described herein use continuous coordinates (e.g., by way of non-limiting example, by representing coordinates with floating point numbers) and transform matrixes (as opposed to simple offset motion vectors) in order to describe movements of groupings of elements, notably increasing precision in describing the actual movements. Motion estimation and compensation are often critical operations in order to achieve high compression ratios. Performing precise motion compensation provides better predictions and thus lower entropy residuals. In prior art methods, motion estimation and compensation in video encoding and video processing have been limited to pel areas with translation movements (typically expressed by means of offset motion vectors), which tends to be a limiting and low quality approach. In fact, objects are affected by a much more complex set of possible movements. In order to capture this complexity, non-limiting innovative embodiments described herein model motion by using transform matrixes rather than motion vectors. Movements like rotations, skews or zooms can be described using affine transforms and homogeneous coordinates. Using higher order matrixes (e.g., projective matrixes), also perspective changes can be described. Usage of transform matrixes in a signal encoding (e.g., video compression) domain is very innovative, and entails a number of consequences that notably distinguish novel embodiments described herein from conventional methods.

A non-limiting embodiment leverages transform matrixes and homogenous coordinates in order to represent complex movements including—without limitation—zoom, rotation and offset. In such embodiment, the signal processor performing motion compensation calculates for every given element with integer coordinates (x, y) of the destination image the corresponding location with continuous coordinates ($x^1$, $y^1$) in the reference image to leverage for motion compensation by multiplying the coordinates of the given element expressed in homogenous coordinates—i.e., (x, y, 1)—by an affine transform matrix. In this way the signal processor essentially calculates an offset motion vector with fractional coordinates for every element of the destination image. The signal processor then calculates the motion-compensated value to assign to the given element (x, y) by performing a weighted average of selected elements of the reference image, whereby both the elements and the weights in the weighted average depend at least in part on location $(x^1, y^1)$.

Another non-limiting embodiment leverages projective transform matrixes, so as to represent even more complex movements. A non-limiting embodiment, in performing the necessary calculations for motion compensation, takes advantage of the modern hardware used in gaming and 3D rendering, so as to exploit continuous-coordinate motion compensation at very limited computational cost. Modern hardware can perform interpolations on the fly (e.g., via on-the-fly resampling) by using float coordinates for the computed element. One of the advantages associated with the usage of fractional coordinates and on-the-fly resampling is the possibility to represent very subtle movements while at the same time reducing memory usage at both the encoder and the decoder side. Motion estimation and motion compensation rely on the resampling operations performed on the fly, without any need for generating and storing large reference images at higher resolutions.

Using continuous coordinates is very important when motion compensation is based on motion matrixes (i.e., more sophisticated movements than a simple translation), because sophisticated movements often require extremely fine sub-pixel resolution, not achievable with the standard technique of supersampling the reference image (e.g., with zoom/divergence, even levels of zoom as small as 1%—i.e., coordinate multiplications by 0.01—are relevant).

In a non-limiting embodiment, motion of specific portions of a signal is expressed by means of parameters corresponding to rotation, scaling, translation and shear mapping. Or, equivalently, with an affine transform matrix such as the following applied to a vector (x, y, 1) in homogenous coordinates—i.e., (x, y, w) with w normalized to 1:

$$M = \begin{bmatrix} a & b & 0 \\ c & d & 0 \\ e & f & 1 \end{bmatrix}$$

In other non-limiting embodiments, motion information is expressed by using projective transforms, i.e., 3×3 matrix with 8 relevant coefficients, and the $9^{th}$ coefficient normalized to 1, thus describing with a single transform scaling, rotation, offset, shearing and perspective change. Since some of such transforms require a division operation for each transform, a non-limiting embodiment uses approximate division operations (e.g., by way of non-limiting examples, using only 16 bits, or using some of the algorithms commonly used for shaders).

Motion matrixes require to send to the decoder a higher number of parameters representing motion with respect to the number of parameters required for simple offset motion vectors: as a consequence, the benefits of using motion matrixes is higher when they are applied to relatively large and arbitrarily-shaped groupings of elements ("motion zones"), e.g. representing an object moving in a consistent way.

In a non-limiting embodiment illustrated herein, a signal processor configured as an encoder receives a current (target) image and a reference image, performs motion estimation and identifies in the current image one or more motion zones (arbitrary—contiguous or non-contiguous—portions of the signal) and corresponding descriptive information on the motion of each motion zone, the motion being expressed in a continuous coordinate system. In a non-limiting embodiment, the encoder decides the maximum number of motion zones based on a set of parameters (e.g., by way of non-limiting example, available computational power, target encoding latency, target compression efficiency, etc.).

In another non-limiting embodiment illustrated herein, a signal processor configured as a decoder receives motion zone information (e.g., a motion zone map) and then receives descriptive information on motion with the motion characteristic of each motion zone (e.g., by way of non-limiting embodiment, by receiving a set of parameters corresponding to a motion matrix for each motion zone). Based at least in part on the motion zone map and on descriptive information on the motion of each motion zone, for each element of the target image the decoder calculates a motion vector, the coordinates of the motion vector being expressed in a continuous coordinate system (e.g., without limitation, by means of floating point numbers). Based on the motion vectors, reference values in arbitrary locations are fetched from a reference image via on-the-fly resampling, allowing for motion compensation with higher precision than traditional approaches based on fixed grids of elements and integer-based coordinates.

In a non-limiting embodiment, the signal processor produces a motion-compensated image with a different number of elements than the reference image. In another non-limiting embodiment, one or more elements of the motion-compensated images are assigned a default value (e.g., "N/A value", for instance—without limitation—wherein the corresponding location in the reference image is outside of the boundary of the image or is itself characterized by an "N/A value", or wherein descriptive information on motion indicates that the specific elements cannot be predicted by means of motion compensation of the reference image).

In accordance with further non-limiting embodiments, the input signal is encoded and decoded by means of a tier-based hierarchical encoding method, and motion compensation with continuous coordinates is leveraged within a tier-based hierarchical encoding loop.

In accordance with one embodiment, computer processor hardware: receives reference image information, the reference image information defining a grid of multiple elements at a given resolution; receives compensation information for an image element in a compensated image, settings of display elements in the compensated image derived at least in part from the reference image information; processes the received compensation information to produce a set of coordinates indicating a corresponding off-grid location of the reference image (such as a location in the reference image that is comprised in between two sampling positions of the sampling grid of the reference image); calculates a value for the corresponding off-grid location of the image element based on a group of multiple elements in the grid; and assigns the value to the image element in the compensated image.

In one embodiment, the coordinates that indicate the corresponding off-grid location are expressed with a substantially higher resolution than the given resolution of the grid.

Calculating the value can include: applying an algorithm to identify which of the multiple elements in the grid to include in the group, the group of multiple elements disposed in a vicinity of the corresponding off-grid location. In one embodiment, the algorithm applies one or more mathematical operations to settings of the group of multiple elements to derive the value for the display element being reconstructed.

In accordance with further embodiments, the set of coordinates indicates the corresponding off-grid location is expressed via numbers representing quantities in a real domain. The set of coordinates indicating the corresponding off-grid location can have a sufficiently high resolution to specify an offset with respect to on-grid locations in the grid by less than 1/32nd of a display element in the grid.

The resolution of the reference image information can be substantially the same as a resolution of the compensated image.

Calculating the coordinates of the off-grid location can include applying floating point operations to numbers in floating point format representing quantities in a real domain.

Calculating the value can include applying floating point operations to numbers in floating point format representing quantities in a real domain.

Calculating the coordinates of the off-grid location can include applying mathematical operations with numbers in fixed-point format representing quantities in a real domain.

Calculating the value can include applying mathematical operations with numbers in fixed-point format representing quantities in a real domain.

The received compensation information can comprise one or more parameters expressed by numbers representing quantities in a real domain.

In one embodiment, the computer processor hardware calculating the value for the display element executes a shader in a Graphics Processing Unit.

As discussed herein, calculating the value for a respective display element can include executing at least one resampling operation based on the calculated respective location in the reference image.

Processing the received compensation information can include: applying linear combinations corresponding to coefficients of a motion matrix to parameters corresponding to coordinates of a respective image element to produce the corresponding set of coordinates in the grid of the reference image; and applying linear combinations corresponding to coefficients of a same motion matrix to produce a respective set of coordinates for each of multiple display elements in the compensated image.

In accordance with further embodiments, processing the received compensation information can include: calculating a vector in homogenous coordinates corresponding to the set of coordinates associated with the image element in the compensated image; and multiplying the vector by a matrix, wherein the coefficients in the matrix are specified at least in part based on the compensation information.

In yet further embodiments, the computer processor hardware calculates the set of coordinates as coordinates $(x^T, y^T)$, the coordinates $(x^T, y^T)$ specifying the off-grid location of the image element, the image element residing at location $(x, y)$ in the compensated image, the coordinates $(x^T, y^T)$ calculated by performing sums and multiplications of x and y with six coefficients a, b, c, d, e and f, according to the following formula: $[x^T \ y^T]=[a \cdot x+c \cdot y+e \ \ b \cdot x+d \cdot y+f]$.

In yet further embodiments, the computer processor hardware calculates the set of coordinates as coordinates $(x^T, y^T)$, the coordinates $(x^T, y^T)$ specifying the off-grid location of the image element, the image element residing at location $(x, y)$ in the compensated image, the coordinates $(x^T, y^T)$ calculated by performing sums and multiplications of x and y with eight coefficients a, b, c, d, e, f, g and h, according to the following formula:

$$[x^T \ y^T] = \left[ \frac{a \cdot x + c \cdot y + e}{g \cdot x + h \cdot y + 1} \ \ \frac{b \cdot x + d \cdot y + f}{g \cdot x + h \cdot y + 1} \right].$$

In accordance with further embodiments, at least one element in the compensated image is not contiguous with a set of other elements in the compensated image for which respective coordinates $(x^T, y^T)$ are calculated according to the same parameters (such as a same motion matrix).

The compensation information can include one or more parameters corresponding to motion types selected from the group comprising: scaling, rotation and offset. The one or more parameters of compensation information can be used to generate one or more motion vectors for display elements in the compensated image. In yet other embodiments, compensation information can include one or more parameters corresponding to motion types selected from the group comprising: scaling, rotation, offset, shearing, perspective change.

Further embodiments herein include associating a default value (such as a "Not available" default value) to a respective set of coordinates that specify a location outside of the grid and that are located with a distance from a closest sample of the grid beyond a given threshold value.

The signal or compensated image being reconstructed can be of any suitable type such as a two-dimensional image, a volumetric image, a mono-dimensional image, a multi-dimensional image, etc.

In accordance with yet another embodiment, computer processor hardware: receives settings information for a first image, the first image including a set of multiple display elements; receives motion compensation information for a given display element in a second image, the motion compensation information indicating a coordinate location within a particular display element in the first image to which the given display element of the second image pertains; utilizes the coordinate location as a basis from which to select a grouping of multiple display elements in the first image; and generates a setting for the given display element in the second image based on settings of the multiple display elements in the grouping.

In this latter embodiment, generating the setting for the given display element can include: calculating the setting for the given display element based at least in part on distances of the multiple display elements in the grouping with respect to the coordinate location in the particular display element.

Generating the setting for the given display element can include: calculating the setting for the given display element based at least in part on settings of the multiple display elements in the grouping.

The coordinate location as specified by motion information can represent a centroid from which to generate the setting of the given display element. Generating the setting for the given display element can include: producing weighted values (such as the coefficients of a resampling kernel), the weighted values varying depending on a respective distance between the centroid of the given display element and a respective centroid of an element in the grouping; and applying the weighted values to settings of the display elements in the grouping to produce the setting for the given display element.

In one embodiment, the coordinate location as specified by the motion information can specify a location other than a center of the particular display element in the first image. Substantially, the coordinate location can specify any location in the first image, as with a continuous coordinate system with arbitrary precision.

As mentioned, in one embodiment, the resolution of the first image can be substantially equal to a resolution of the second image. In accordance with further embodiment, the resolution of the first image can be substantially equal to a resolution of the second image, but with a larger field of view (i.e., the first image substantially comprises more information than the second image). In accordance with further embodiments, the resolution of the first image (or reference image) can be substantially different than a resolution of the second image (reproduced image based on reference image). For instance, the first image can be a predictor image at a lower level of quality in a tiered temporal hierarchy, with a lower resolution than the second image.

In accordance with further embodiments, utilizing the coordinate location as a basis from which to select the grouping of multiple display elements in the first image can include: creating the grouping of multiple display elements to include the particular display element and a display element in the first image located in a vicinity of the particular display element; and interpolating the setting of the given display element based on: i) a proximity of the coordinate location with respect to a centroid of the particular display element and a centroid of the display element in the vicinity of the particular display element, ii) a setting of the particular display element, and iii) a setting of the display element located in the vicinity of the particular display element.

In still further embodiments, the first image is a reference image; the set of multiple display elements represents at least a portion of an object present in the first image.

As further described herein, the coordinate location as specified by a motion vector can represent an offset of the given display element with respect to a centroid of the particular display element by a fraction of a display element greater than zero but less than 1.

Note that embodiments herein may be implemented in software or hardware, or may be implemented using a combination of software and hardware, and can include a configuration of one or more computerized devices, routers, network, workstations, handheld or laptop computers, tablets, mobile phones, game consoles, set-top boxes, etc., to carry out and/or support any or all of the method operations disclosed herein. In other words, one or more computerized devices or processors can be programmed and/or configured to operate as explained herein to carry out different embodiments.

In addition to the techniques as discussed above, yet other embodiments herein include software programs to perform the steps and operations summarized above and disclosed in detail below. One such embodiment comprises a computer-readable, hardware storage resource (i.e., a non-transitory computer readable media) including computer program logic, instructions, etc., encoded thereon that, when performed in a computerized device having a processor and corresponding memory, programs and/or causes the processor to perform any of the operations disclosed herein. Such arrangements can be provided as software, code, and/or other data (e.g., data structures) arranged or encoded on a computer readable medium such as an optical medium (e.g., CD-ROM, DVD-ROM or BLU-RAY), flash memory card, floppy or hard disk or any other medium capable of storing computer readable instructions such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein.

Accordingly, one particular embodiment of the present disclosure is directed to a computer program product that includes a computer-readable hardware storage medium having instructions stored thereon for supporting signal processing operations.

One or more embodiments herein include a computer readable storage medium and/or system having instructions stored thereon. The instructions, when executed by computer processor hardware of one or more computer devices, causes the computer processor hardware to perform operations of: receiving reference image information, the reference image information defining a grid of multiple elements at a given resolution; receiving compensation information for an image element in a compensated image, settings of display elements in the compensated image derived at least in part from the reference image information; processing the received compensation information to produce a set of coordinates indicating a corresponding off-grid location of the image element in the grid; calculating a value for the corresponding off-grid location of the image element based on a group of multiple elements in the grid; and assigning the value to the image element in the compensated image.

One or more embodiments herein include a computer readable storage medium and/or system having instructions stored thereon. The instructions, when executed by computer processor hardware of one or more computer devices, causes the computer processor hardware to perform operations of: receiving settings information for a first image, the first image including a set of multiple display elements; receiving motion compensation information for a given display element in a second image, the motion compensation information indicating a coordinate location within a particular display element in the first image to which the given display element pertains; utilizing the coordinate location as a basis from which to select a grouping of multiple display elements in the first image; and generating a setting for the given display element in the second image based on settings of the multiple display elements in the grouping.

The ordering of the steps has been added for clarity sake. These steps can be performed in any suitable order.

Other embodiments of the present disclosure include software programs, firmware, and/or respective hardware to perform any of the method embodiment steps and operations summarized above and disclosed in detail below.

Also, it is to be understood that the system, method, apparatus, instructions on computer readable storage media, etc., as discussed herein can be embodied strictly as a software program, as a hybrid of software, firmware, and/or hardware, or as hardware alone such as within a processor, or within an operating system or within a software application, etc.

As discussed above, techniques herein are well suited for use in software, firmware, and/or hardware applications that process signals and produce bitstreams of encoded data, or that process bitstreams of encoded data and produce renditions of signals. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended that each of the concepts can be executed independently of each other or in combination with each other. Accordingly, the one or more present inventions, embodiments, etc., as described herein can be embodied and viewed in many different ways.

Also, note that this preliminary discussion of embodiments herein does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

FIG. 3 shows two sample images that are object of motion estimation and compensation, together with the corresponding information generated at encoding by a non-limiting embodiment illustrated herein.

FIGS. 9 and 10 are diagrams illustrating example methods according to embodiments herein.

DETAILED DESCRIPTION AND FURTHER SUMMARY OF EMBODIMENTS

Methods illustrated herein are suitable for any type of multi-dimensional signals, including without limitation sound signals, multichannel sound signals, pictures, two-dimensional images, video signals, multi-view video signals, 3D video signals, volumetric signals, volumetric video signals, medical imaging signals, signals with more than four dimensions, etc.

For simplicity, along the description the illustrated embodiments usually adopt the use case of motion zones used in the context of motion compensation operations for the encoding and decoding of video sequences, i.e., time-based signals consisting of a sequence of 2D images (commonly called "frames", or "fields" in the case of interlaced video signals), with each element (in such non-limiting example case typically referred to as "pixel") being characterized by a set of color settings in a suitable color space (e.g., YUV, RGB, HSV, etc.). Different color planes (e.g., the luminance-Y plane and the two chrominance—U and V—planes) are often encoded separately, and often with different resolutions (due to the lower sensitivity of the human eye to chrominance information), although the U and V planes typically leverage motion compensation information calculated for the Y plane.

Methods and embodiments illustrated herein can be used in conjunction with one another and/or with other methods. Many of the preferred embodiments illustrated herein describe techniques and algorithms with the goal of achieving compression, i.e., encoding a suitable rendition of the signal with a minimum quantity of bits. This also is a non-limiting example: other non-limiting embodiments achieve different purposes, such as robust and efficient filtering, image denoising, signal supersampling, machine vision, etc.

Figure 1:
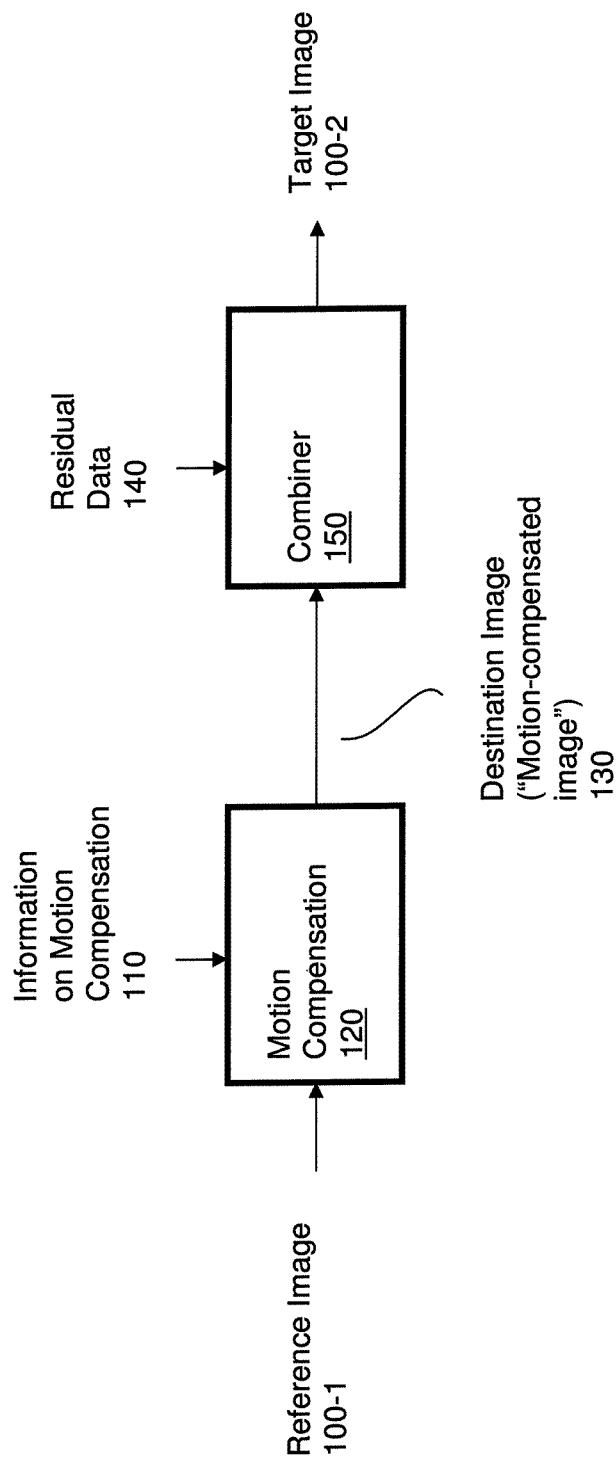
FIG. 1 is an example diagram describing a motion compensation system leveraging non-limiting embodiments illustrated herein.

FIG. 1 is an example diagram describing a motion compensation system within a signal processor configured as a decoder. The system is configured to reconstruct a target image 100-2 based on motion compensation of a reference image 100-1 and on residual data.

Motion Compensation block 120 receives Reference Image 100-1 and Information on Motion Compensation 110, the information 110 specifying how to leverage Reference Image 100-1 in order to generate a suitable prediction for Target Image 100-2.

Based at least in part on Reference Image 100-1 and on information 110, Motion Compensation block 120 generates Destination Image 130, i.e., a motion-compensated image which serves as a prediction for Target Image 100-2.

Combiner 150 combines Destination Image 130 with Residual Data 140, reconstructing a rendition of Target Image 100-2.

Novel methods described herein illustrate innovative approaches to perform the function of Motion Compensation block 120.

Figure 2:
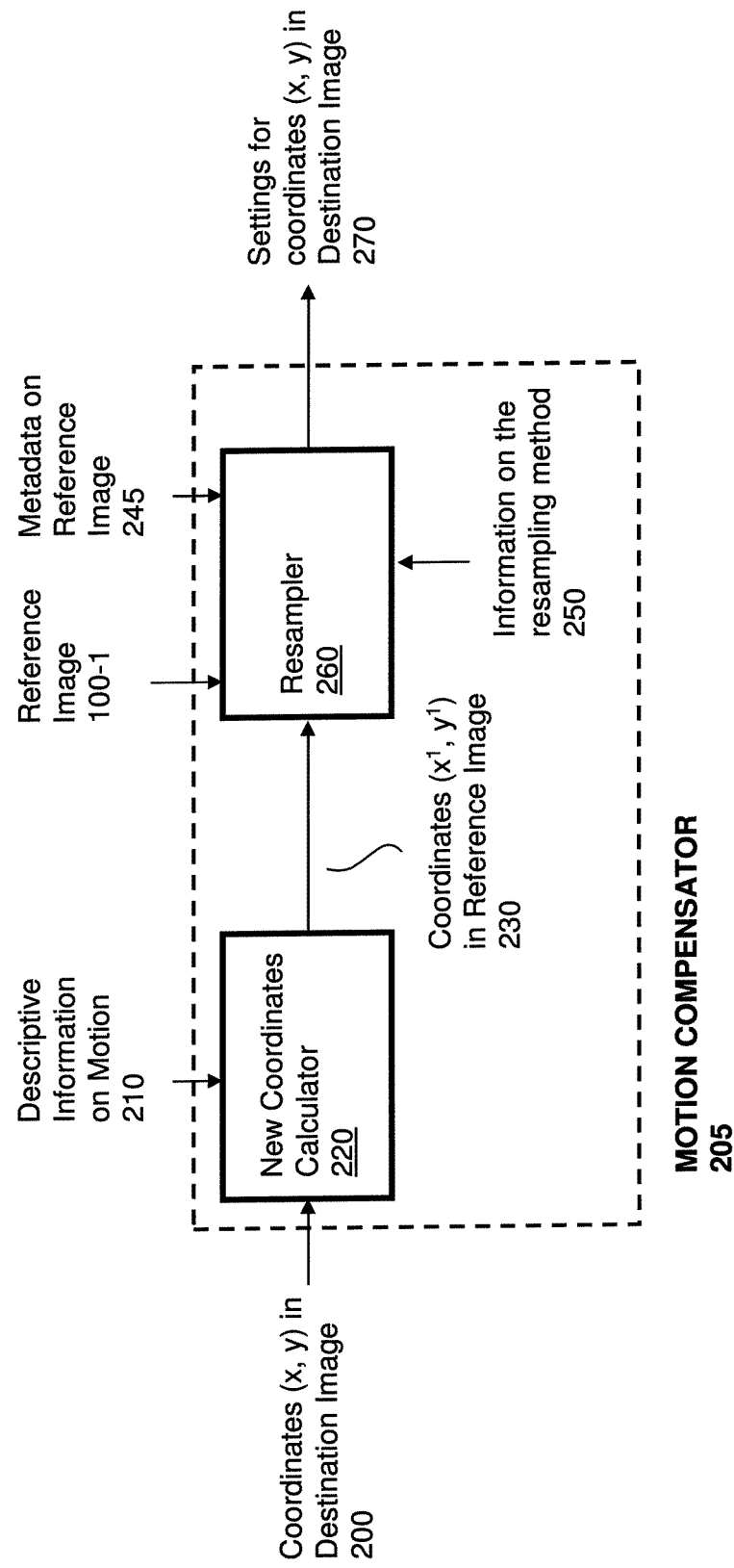
FIG. 2 is an example diagram describing motion compensation operations according to non-limiting embodiments illustrated herein.

FIG. 2 is an example diagram describing motion compensation operations according to a non-limiting embodiment. For each element of the Destination Image 130, Motion Compensator 205 generates motion-compensated settings (i.e., values that are based on motion compensation of a suitable location of the reference image), according to the steps illustrated in the diagram.

First of all, New Coordinates Calculator 220 receives the coordinates (x, y) 200 of the given element in the Destination Image and Descriptive Information on Motion 210, calculating Coordinates $(x^1, y^1)$ 230. Coordinates $(x^1, y^1)$ represent the location in the Reference Image that correspond to location (x, y) of the Destination Image. According to the invention, $x^1$ and $y^1$ are expressed with a continuous coordinates system (e.g., by means of floating point numbers, or high-precision fixed point numbers), essentially allowing to indicate an arbitrary location of the Reference Image, regardless of the actual resolution (i.e., sampling grid) of the Reference Image.

Since $(x^1, y^1)$ are not necessarily identifying an element of the Reference Image (which would be characterized by integer coordinates), Motion Compensator 205 cannot directly fetch the value of the Reference Image in location $(x^1, y^1)$. In the described non-limiting embodiment, an on-the-fly resampling method is used, with Resampler 260 receiving Reference Image 100-1, Metadata 245 on the Reference Image (if any) and Information 250 on the resampling method to leverage, thus generating the value of the Reference Image in location ($x^1$, $y^1$), i.e., the specific settings 270 to use for coordinates (x, y) of the Destination Image.

Resampler 260 performs on-the-fly filtering (i.e., after having received coordinates 230) of the elements of Reference Image 100-1 surrounding the specified arbitrary location with continuous coordinates ($x^1$, $y^1$). The filtering is performed according to a suitable kernel, by selecting, based on Information on the resampling method 250, among a Lanczos filter, a cubic filter or a linear filter (in absence of Information 250, Resampler 260 selects a default kernel). In this way, for a decoder implementing motion compensation with Motion Compensator 205 it is not necessary to compute and store a supersampled rendition of Reference Image 100-1, and select samples from the finite grid of such supersampled rendition. The decoder may just store a reference image with normal sample grid (i.e., the same resolution as the destination image) and select any arbitrary position, generating/interpolating on the fly the corresponding sample value in the reference image for the arbitrary position. In some situations such method allows for significant reduction of memory requirements at the decoder, and at the same time also allows for more precise motion compensation (with corresponding compression benefits). In other situations the method also allows for savings in terms of processing power: the decoder just produces the supersampled reference samples that it needs in the specific positions where it needs them, not having to generate—either for the whole image or for portions of the image—a whole supersampled reference grid (i.e., also calculating many samples that will never be accessed, leveraged or displayed).

FIG. 3 shows two sample images that are object of motion estimation and compensation, together with the corresponding information generated at encoding by a non-limiting embodiment illustrated herein.

In particular, the diagram illustrates two subsequent images 100-1 and 100-2 in a sequence of images. The images show significant correlation between each other, and such correlation can be enhanced even further by means of motion compensation: the background slightly rotates counter-clockwise, and an object 301-1 in image 100-1 moves to become object 301-2 in image 100-2 (wherein the movement involves both translation toward the lower right and de-zoom, i.e., the object is becoming smaller). An object 302-2, not visible in image 100-1, becomes visible in image 100-2.

A non-limiting embodiment is able, by starting from the images 100-1 (reference image) and 100-2 (target image), to encode/decode a target image by using motion zones having arbitrary shapes (e.g., contiguous or even non-contiguous), wherein the shapes are chosen on the basis of images 100-1 and 100-2. The shape of each motion zone can be arbitrary, and is not limited to rectangular blocks. In some situations this may allow to increase the efficiency and the effectiveness of motion compensation, more closely following the borders of objects (e.g., avoiding to "drag" elements that are close to the borders of a moving object) and more efficiently transmitting accurate motion information for each given element of an image.

More specifically, by processing images 100-1 and 100-2, an encoder identifies motion zone 311-2 (representing the portion of the background of image 100-2 that can be efficiently predicted by motion-compensating elements of reference image 100-1), motion zone 312-2 (representing object 301-2 of image 100-2, which can be efficiently predicted by motion-compensating object 301-1 in image 100-1) and a non-contiguous residual motion zone made of 313-2, 314-2 and 315-2 (representing the elements of image 100-2 that were not visible in image 100-1, and consequently cannot be predicted by motion-compensating elements of image 100-1).

Encoder 100 also generates descriptive information 320-2 associated to motion zones. In a non-limiting embodiment, such information comprises a ZRO (Zoom, Rotation and Offset) motion matrix for each motion zone, and a default parameter for the residual motion zone ("N/A motion", meaning that the elements of the residual motion zone cannot be suitably predicted through motion compensation).

The detection of motion zones and the generation of descriptive information associated to motion zones is performed according to suitable motion zone detection methods, not described in this application.

Lastly, the encoder generates residual data 330-2 to adjust the prediction of the target image 100-2 obtained by means of motion-zone-based motion compensation of reference image 100-1. Combined with the prediction obtained by motion compensation, residual data allow to fully reconstruct a rendition of target image 100-2.

A method for decoding images encoded by using the above-described encoding method comprises the following phases:
 a. receiving at least one motion zone and one set of descriptive information on motion;
 b. receiving a first (reference) image;
 c. computing a motion-compensated prediction for the second (target) image by using the first image received during phase b, the motion zones and the descriptive information on motion received during phase a;
 d. receiving and decoding residual data (if any);
 e. combining the prediction for the second image with residual data (if any), producing a rendition of the second image.

One or more of the phases can occur concurrently, without being strictly sequential.

Figure 4A:
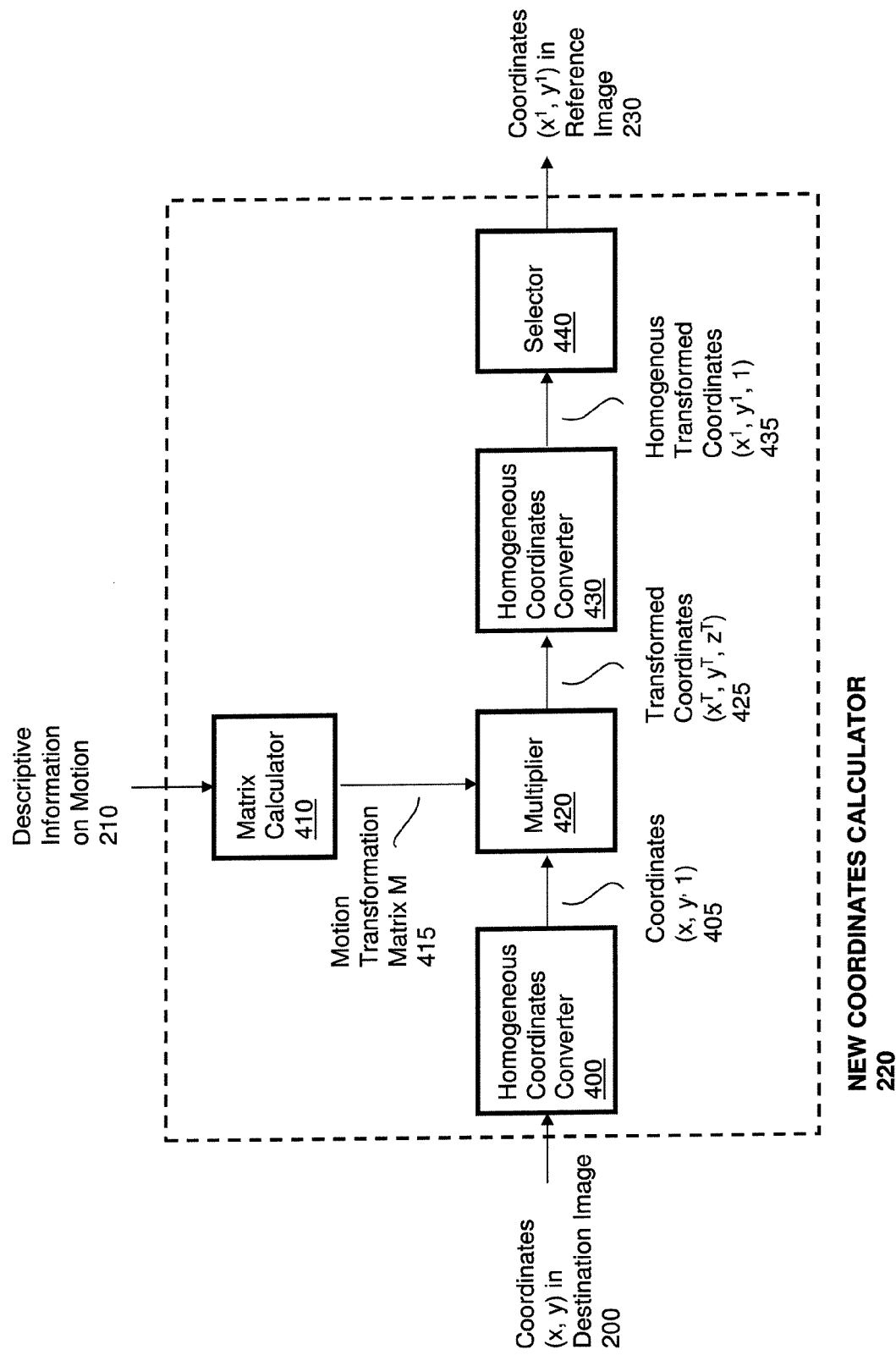
FIG. 4A is an example diagram describing calculation of a reference location in the reference image according to non-limiting embodiment illustrated herein.

FIG. 4A is an example diagram describing calculation of a reference location in the reference image, illustrating a non-limiting embodiment of New Coordinate Calculator 220.

Homogenous Coordinate Converter 400 receives coordinates (x, y) of the element in the Destination Image and converts them into homogenous coordinates (x, y, 1) 405. Matrix Calculator 410 receives Descriptive Information on Motion 210 and converts it into Motion Matrix M 415. Multiplier 420 receives homogenous coordinates 405 and motion matrix 415, and calculates Transformed Coordinates 425. If Motion Matrix M 415 was an affine transform, the third coordinate of Transformed Coordinates 425 would already be equal to one, otherwise (e.g., if matrix M was a projective matrix) it is necessary to normalize coordinates 425. Homogenous Coordinates Converter 430 performs such normalization (if necessary), generating homogenous coordinates ($x^1$, $y^1$, 1). Lastly, Selector 440 generates Coordinates ($x^1$, $y^1$) in the Reference Image.

Coordinates (x, y) of the element in the Destination Image describe an element of the sample grid of the Destination Image (i.e., they describe integer positions of the sample grid), while Coordinates ($x^1$, $y^1$)—expressed with fractional numbers—may describe any arbitrary location of the Reference Image (comprising, without limitation, locations outside of the boundaries of the sample grid of the Reference Image). Coefficients of Matrix M 415 may be fractional numbers, and calculations performed within New Coordinate Calculator 220 comprise calculations with fractional numbers (e.g., without limitation, floating point operations, or operations with high-precision fixed point numbers).

Figure 4B:
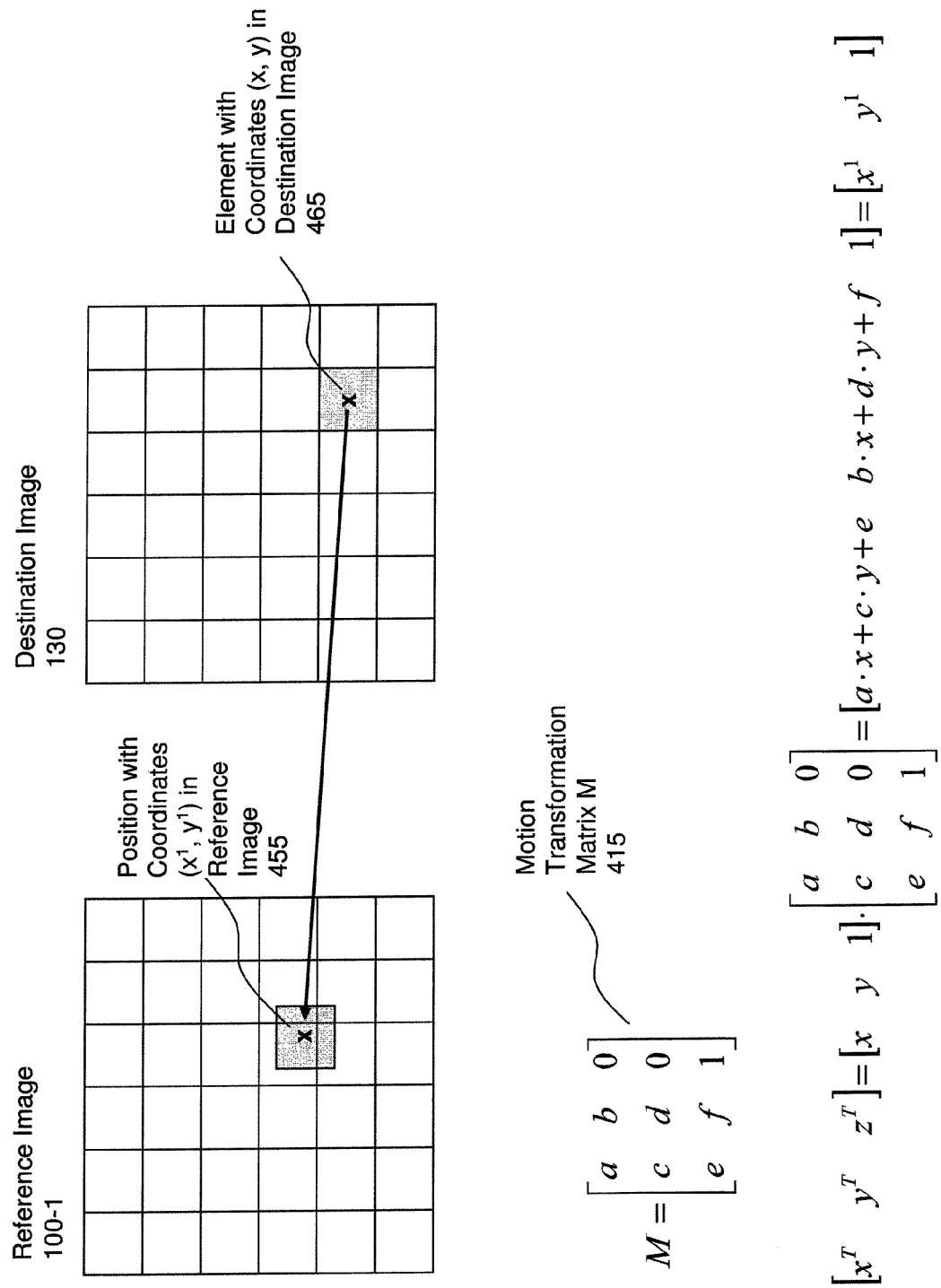
FIG. 4B illustrates a non-limiting example of the computations described in FIG. 4A.

FIG. 4B illustrates a non-limiting example embodiment of the computations described in FIG. 4A. The non-limiting example shows a case in which Motion Matrix M 415 corresponds to an affine transform, so that the multiplication of (x, y, 1) times Matrix M generates a set of coordinates ($x^1$, $y^1$, 1) that is already normalized.

In a non-limiting embodiment, when coordinates 200 of element 465 and matrix 415 are such that coordinates 230 of position 455 are outside of the reference image beyond a threshold (e.g., without limitation, outside of the sampling grid of the reference image by an amount higher than the distance between two neighbouring elements), element 465 is assigned a default value (e.g., "N/A" value).

Figure 5:
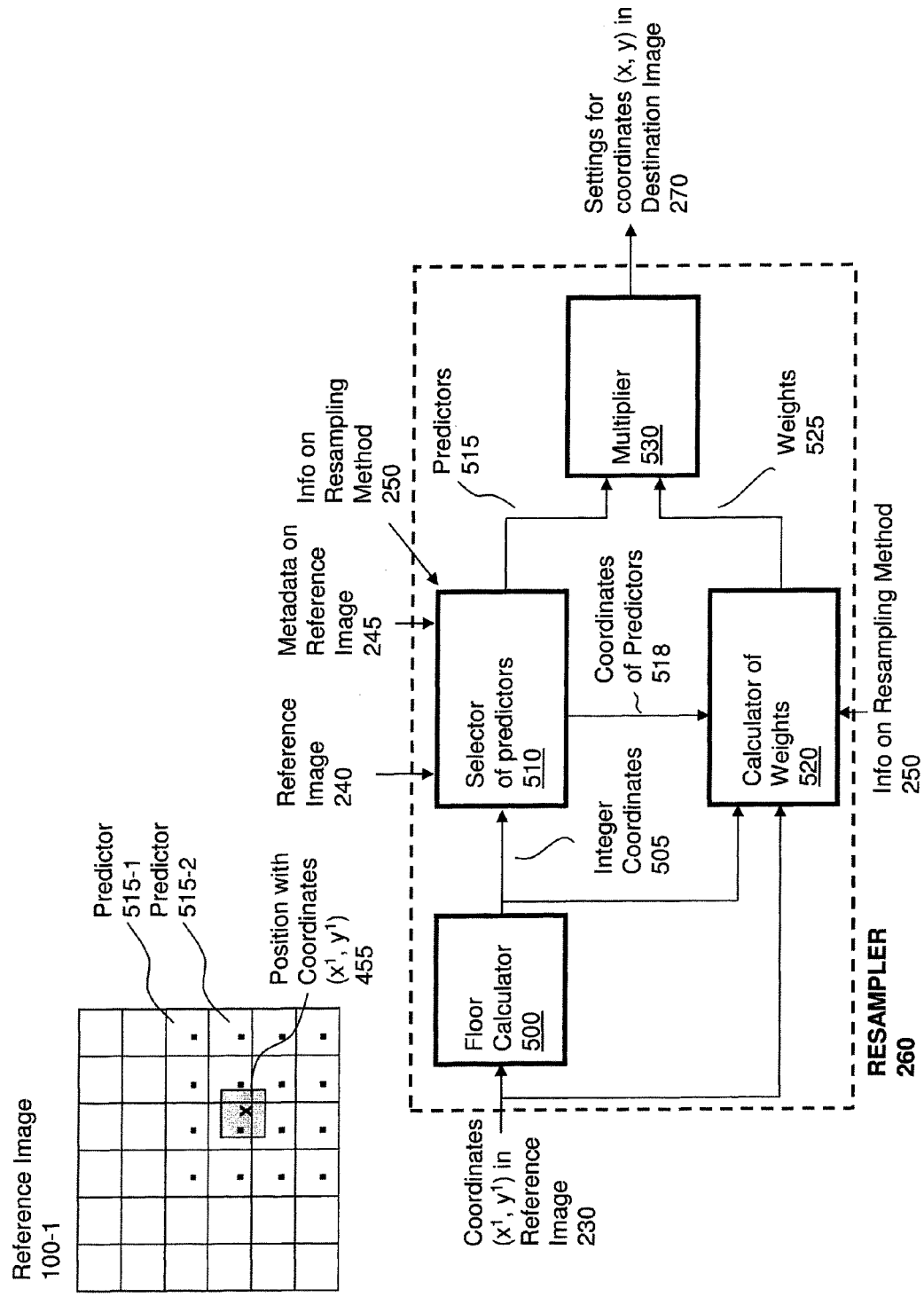
FIG. 5 is an example diagram describing on-the-fly resampling operations according to non-limiting embodiments illustrated herein.

FIG. 5 is an example diagram describing on-the-fly resampling operations according to a non-limiting embodiment.

Position 455 with coordinates ($x^1$, $y^1$) is not described by any element of the sample grid of Reference Image 100-1. As a consequence, no value is readily available for the corresponding motion-compensated element of Destination Image 130. However, it is possible to calculate such a value on the fly, by selecting a suitable set of elements ("predictors") close to coordinates ($x^1$, $y^1$) and by performing a weighted average of their values according to suitable weights (e.g., a suitable filtering kernel). FIG. 5 illustrates a non-limiting example where a bicubic filter kernel is used, and consequently the value of Reference Image 100-1 in position ($x^1$, $y^1$) is calculated by performing a weighted average of 16 predictor elements.

In order to perform the resampling, Resampler 260 must identify the 16 predictors to leverage for the weighted average (i.e., where to "position the filter") and must compute the specific weights to be used. The integer component of the ($x^1$, $y^1$) coordinates indicate where to position the filter, and the fractional component of the coordinates indicate what coefficients to use in the filter.

Floor Calculator 500 receives Coordinates ($x^1$, $y^1$) 230, calculating the integer components 505 of coordinates ($x^1$, $y^1$). In the non-limiting example of coordinates based on an origin at the top left of the reference image, the Integer Coordinates 505 identify the closest element of the sample grid at the top left of coordinates ($x^1$, $y^1$). Selector of Predictors 510, which receives Reference Image 240, Metadata on Reference Image 245 (if any) and Info on Resampling Method 250 (if any), is thus able to select the 16 predictors, by selecting the 4×4 block of elements of the reference image that has the element with coordinates 505 as the second element in the diagonal from the top left of the block. If some of the 16 predictors are assigned "N/A" (not available value, e.g., because they are outside of the boundaries of the reference image), they are taken out of the set of predictors, and only the predictors with a value are kept.

Calculator of Weights 520 receives coordinates ($x^1$, $y^1$) and the coordinates of the predictors. Based on the chosen resampling method (e.g., in this non-limiting example, bicubic filtering) and on the fractional component of coordinates ($x^1$, $y^1$)—i.e., on the distance between position ($x^1$, $y^1$) and the element with integer coordinates 505—Calculator of Weights 520 calculates the weights to apply to each predictor. If less than 16 predictors have been selected, Calculator of Weights 520 generates the suitable bicubic weights for the ideal 4×4 kernel, then selects only the coefficients corresponding to the predictors that were selected and normalizes the coefficients so that their sum is equal to 1.

Finally, Multiplier 530 receives both the predictors and the weight to apply to each predictor, consequently calculating the resampled value of Reference Image in position ($x^1$, $y^1$), i.e., Settings 270 for coordinates (x, y) in the destination image.

In a non-limiting embodiment, in order to avoid the need to generate in real time the precise coefficients of the filter based on the specific ($x^1$, $y^1$) coordinates, the signal processor implementing Calculator of Weights 520 is configured so as to access suitable lookup tables with a given number of pre-calculated sets of coefficients (e.g., in a non-limiting example, 128 sets of coefficients), and then to interpolate the coefficients of the two sets of coefficients that are closest to the fractional components of the specific ($x^1$, $y^1$) coordinates.

In a non-limiting embodiment, metadata 245 on reference image contains information on modifications to apply to Reference Image 100-1 before motion compensation (e.g., without limitation, a scale parameter to apply to values of the image, so as to account for changes in lighting).

Figure 6:
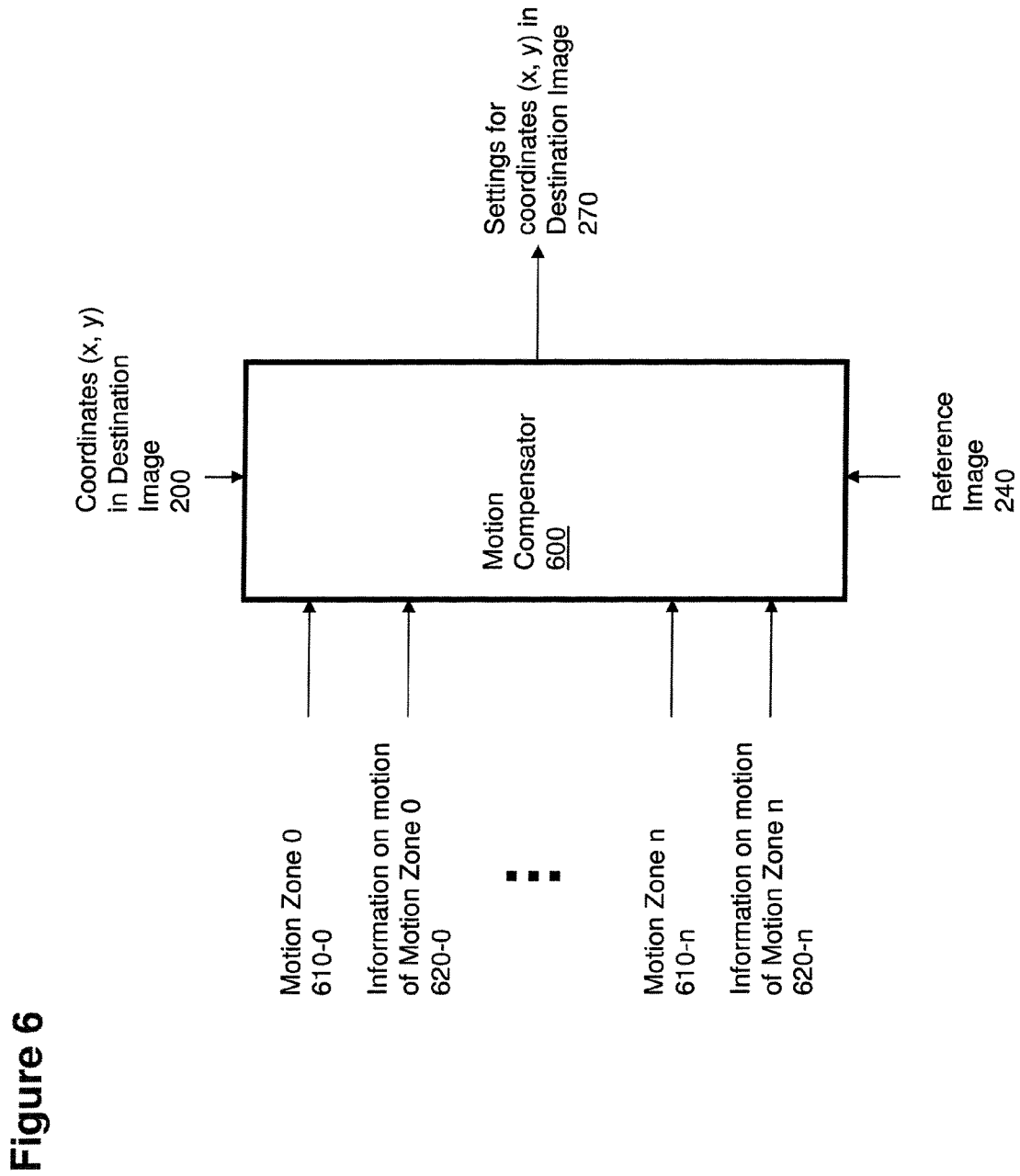
FIG. 6 shows a block diagram that implements motion compensation according to non-limiting embodiments illustrated herein.

FIG. 6 shows a block diagram that implements motion compensation according to a non-limiting embodiment leveraging motion zones. In particular, Motion Compensator 600 generates a prediction of the target image by means of motion compensation with continuous coordinates.

Block 600 receives information comprising a first set of input 610-0, . . . , 610-n, and 620-0, . . . , 620-n for motion zones and descriptive information on motion, a second input 200 for element coordinates (x, y) in the destination image (i.e., identifying the specific element to predict, according to the sample grid of the destination image), a third input 240 for the reference image, and an output 270 for the values to assign to the motion compensated element (i.e., the settings for coordinates (x, y) in the destination image). Based on element coordinates 200, Motion Compensator 600 identifies the motion zone(s) to which the element belongs, and—based at least in part on the corresponding descriptive information on motion and on element coordinates 200—generates the location ($x^1$, $y^1$) in reference image 240—specified with a continuous coordinate system, independently of the sample grid of the reference image and assuming that it is possible to fetch a value for any arbitrary location in the reference image—that corresponds to element coordinates 200 in the destination image. Lastly, based on reference image 240 and on the generated location ($x^1$, $y^1$), motion compensator 600 calculates the motion-compensated settings 270 (i.e., the prediction) for the specific element in position (x, y) of the sample grid of the destination image.

Figure 7:
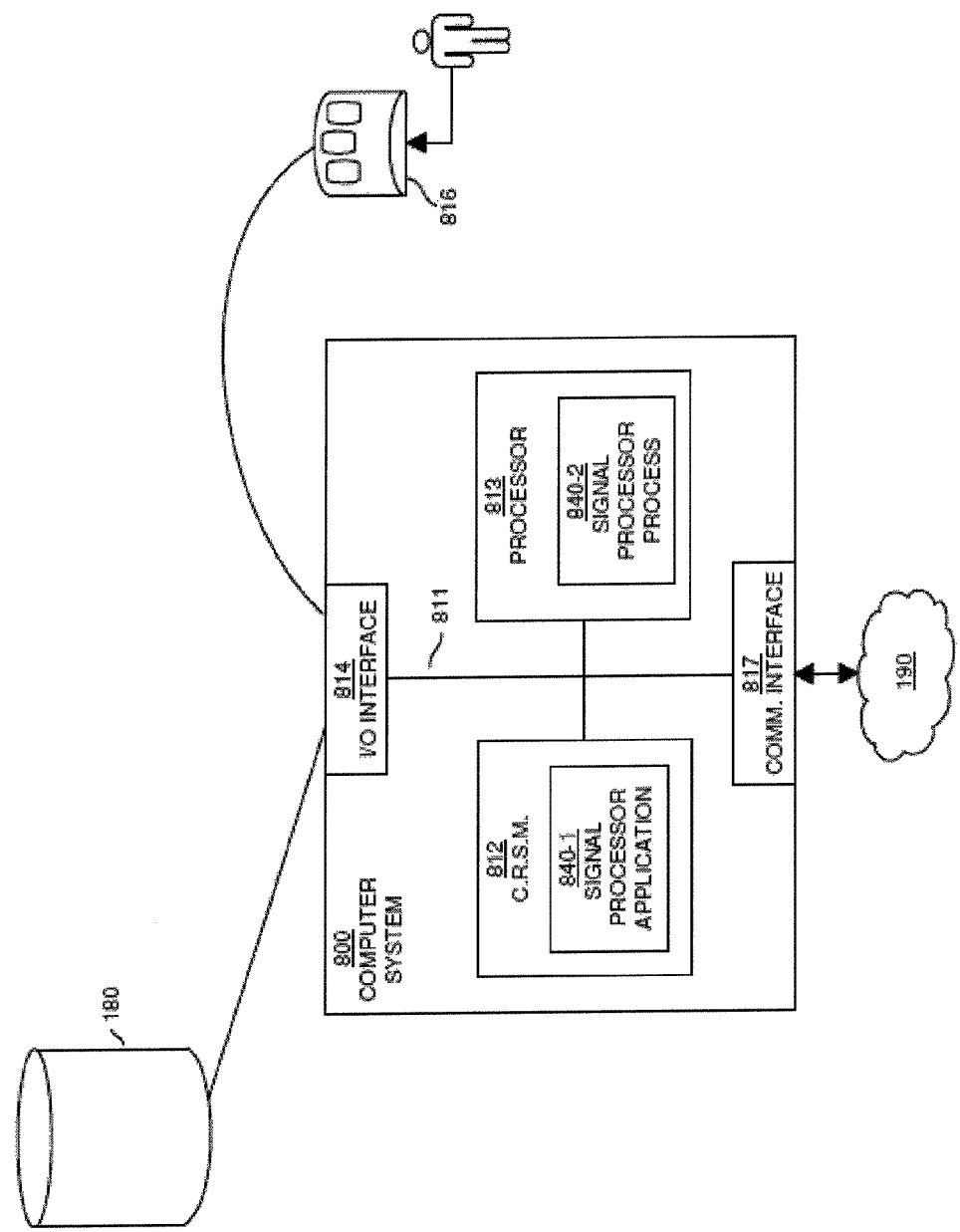
FIG. 7 shows a block diagram of a computer system that provides data processing according to the invention described herein.

FIG. 7 is a block diagram of a computer system 800 that provides computer processing according to embodiments herein.

Computer system 800 can be or at least include a computerized device such as a personal computer, processing circuitry, television, playback device, encoding device, workstation, portable computing device, mobile phone, tablet, console, set top box, network terminal, processing device, network device, operating as a switch, router, server, client, etc.

Note that the following discussion provides a basic embodiment indicating how to carry out functionality associated with a signal processor as previously discussed. However, it should be noted that the actual configuration for carrying out the operations as described herein can vary depending on a respective application.

As shown, computer system 800 of the present example comprises a communication bus 811, which provides communication with a computer readable storage media 812 such as a non-transitory computer-readable storage medium, etc., in which digital information can be stored and retrieved.

Computer system 800 can further comprise a processor 813, an I/O interface 814, and a communications interface 817.

In one embodiment, I/O interface 814 provides connectivity to repository 180, and if present, to a screen display, audio speakers, peripheral devices 816 such as a keyboard, a computer mouse, etc.

As briefly mentioned above, the computer readable storage media 812 can be any suitable device and/or hardware such as memory, optical storage, solid state storage, hard drive, floppy disk, etc. In one embodiment, the storage media 812 is a non-transitory storage media (i.e., non-carrier wave media) configured to store instructions associated with a signal processor application 840-1. The instructions are executed by a respective resource such as the processor 813 in order to perform any of the operations as discussed herein.

The communications interface 817 enables computer system 800 to communicate over a network 190 in order to retrieve information from remote sources and communicate with other computers, switches, clients, servers, etc. The I/O interface 814 also enables processor 813 to retrieve or attempt retrieval of stored information from repository 180.

As shown, the computer readable storage media 812 can be encoded with signal processor application 840-1 executed by processor 813 as a process 840-2.

Note that the computer system 800 can be embodied to include a computer readable storage media 812 for storing data and/or logic instructions.

The code associated with the signal processor application 840-1 can implement the functionalities of the signal processors illustrated herein and/or other resources necessary to implement the invention discussed herein.

During operation of one embodiment, processor 813 accesses computer readable storage media 812 via the communication bus 811 in order to launch, run, execute, interpret or otherwise perform the instructions of signal processor application 840-1 stored in computer readable storage media 812. Execution of the signal processor application 840-1 produces processing functionality in processor 813. In other words, the signal processor process 840-2 associated with processor 813 represents one or more aspects of executing signal processor application 840-1 within or upon the processor 813 in the computer system 800.

Figure 8:
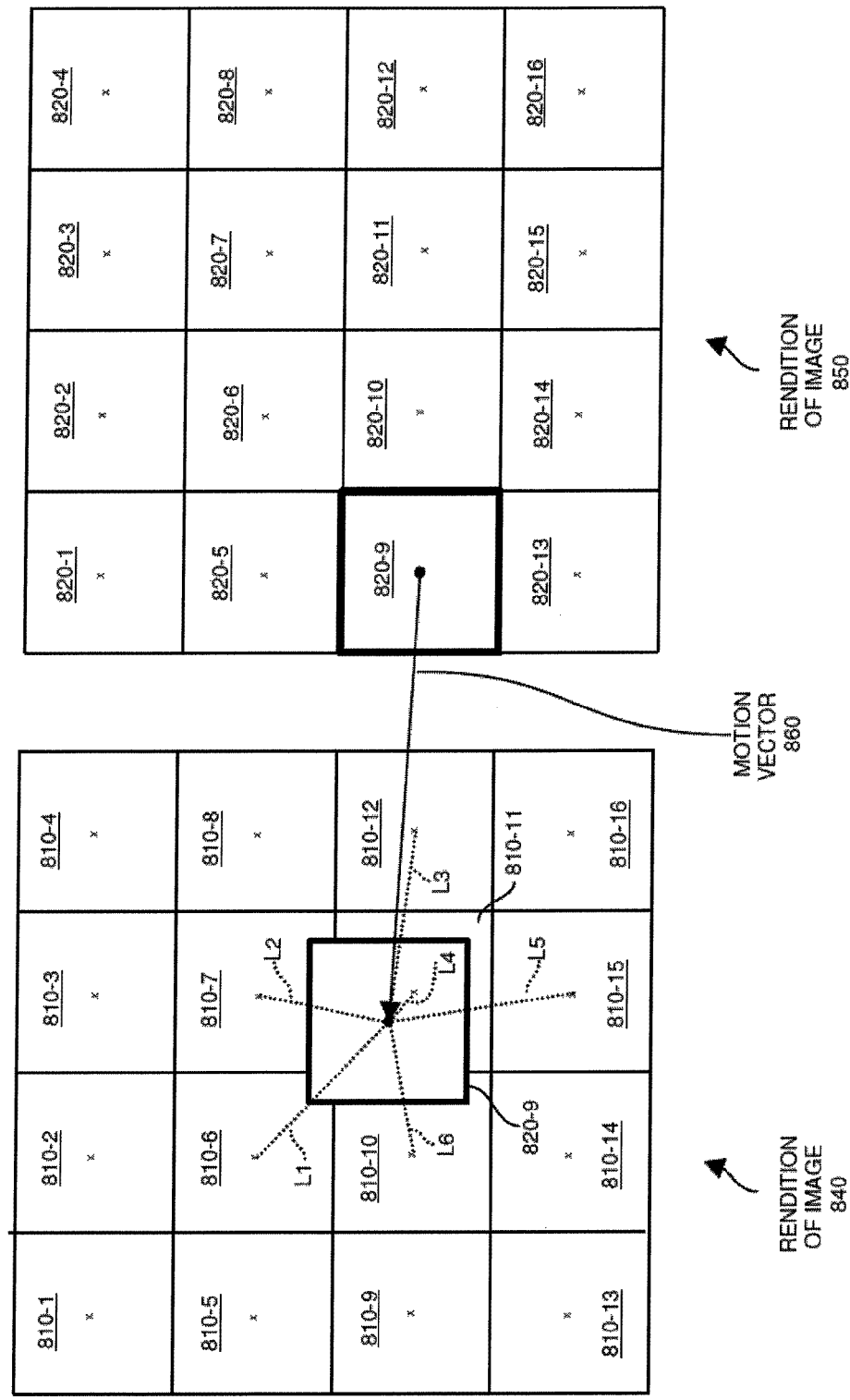
FIG. 8 is an example diagram illustrating decoding of a signal according to embodiments herein.

FIG. 8 is an example diagram illustrating use of a reference image to derive settings for image elements in a compensated image according to embodiments herein.

More specifically, as shown, computer processor hardware such as a decoder receives settings information specifying settings of display elements 810 (e.g., display elements 810-1, 810-2, 810-3, . . . ) in rendition of image 840 (such as a reference image). The settings can indicate any suitable parameter such as color, chrominance, luminance, etc.

One or more of the display elements in the rendition of image 840 can represent at least a portion of an object present in the reference image. The rendition of image 850 can represent another image in a sequence that includes a portion of the object captured in the reference image. As discussed herein, the reference image (rendition of image 840) can be used as a basis to reconstruct another image such as rendition of image 850.

In this non-limiting example embodiment, rendition of image 850 such as a motion compensated image includes multiple display elements 820 (e.g., display element 820-1, display element 820-2, display element 820-3, and so on). As previously discussed, the rendition of image 850 can be generated based on a rendition of an object in reference image. Motion vector 860 specifies a precise location in the rendition of image 840 to which the display element 820-9 pertains. According to embodiments herein, as an alternative to upsampling the rendition of image 840 into a supersampled (i.e., super high resolution) image as in conventional methods, to accommodate sub-element or fractional element motion compensation for one or more elements, embodiments herein include deriving a setting for display element 820-9 based on a relatively low level of quality or low resolution rendition of image 840.

As a specific example, the computer processor hardware receives motion compensation information and/or other metadata or reconstruction data for display element 820-9 in rendition of image 850. Rendition of image 850 represents an image being created based at least in part on settings of display elements in rendition of image 840 (reference image). Received motion compensation information indicates a coordinate location within a display element 810-11 in the rendition of image 840 to which the display element 820-9 pertains. The received reconstruction data to reconstruct the settings for display element 820-9 can specify which of one or more reference images as well as one or more locations within each reference image are to be used as a basis to reconstruct a respective setting for the display element. In a simple example embodiment, motion compensation information indicates a location within a single reference image to use as a basis to determine settings for the display element 820-9.

In one embodiment, computer processor hardware converts the received compensation information into motion vector 860 (assigned to display element 820-9) specifying an off-grid location in rendition of image 840 (grid) to which the element 820-9 pertains. The location of display element 820-9 is off-grid in rendition of image 840 because it does not fall directly over only a single display element in rendition of image 840. In this example embodiment, the location of image element 820-9 as specified by the motion vector 860 at least partially overlaps multiple display elements 810-6, 810-7, 810-10, and 810-11 in rendition of image 840.

The computer processor hardware utilizes the coordinate location as specified by the motion vector 860 as a basis from which to select a grouping of multiple display elements in the rendition of image 840. For example, in this example embodiment, due to proximity or other suitable parameter, assume that the computer processor hardware selects display elements 810-6, 810-7, 810-10, 810-11, 810-12, and 810-15 as suitable nearby elements from which to generate one or more settings for display element 820-9. Based on such settings of selected display elements 810-6, 810-7, 810-10, 810-11, 810-12, and 810-15, the computer processor hardware generates settings for display element 820-9.

In one embodiment, the computer processor hardware calculates setting information for display element 820-9 based on rendition of image 840 as if display element 820-9 were located in the fractionally offset location as specified by the motion vector 860. For example, the centroid of display element 820-9 as specified by the motion vector 860 does not align exactly over the centroid of display element 810-11. Embodiments herein include generating a setting for the display element 820-9 in the second image based on settings of the multiple display elements 810-6, 810-7, 810-10, 810-11, 810-12, and 810-15 in the selected grouping.

Note that any suitable algorithm amongst multiple algorithms can be used to derive the setting for the display element 820-9 based on the selected grouping of display elements. For example, assume in this example that received reconstruction information associated with display element 820-9 indicates to the computer processor hardware to use a particular algorithm to generate the grouping to include display elements 810-6, 810-7, 810-10, 810-11, 810-12, and 810-15 as mentioned above.

In accordance with a specified algorithm, the computer processor hardware calculates the setting for the display element 820-9 based at least in part on distances of the multiple display elements in the grouping with respect to the coordinate location (of the centroid of display element 820-9 as specified by the motion vector 860) in the particular display element 810-11.

For example, the length of line L1 represents a distance between centroid (i.e., center) of display element 810-6 (as depicted by respective symbol x in center of display element 810-6) and a centroid of display element 820-9 (as specified by the motion vector 860 and as depicted by a dot in display element 820-9); the length of line L2 represents a distance between centroid of display element 810-7 (as depicted by respective symbol x in center of display element 810-7) and a centroid of display element 820-9 (as specified by the motion vector 860 and as depicted by a dot in display element 820-9); the length of line L3 represents a distance between centroid of display element 810-12 (as depicted by respective symbol x in center of display element 810-12) and a centroid of display element 820-9; the length of line L4 represents a distance between centroid of display element 810-11 (as depicted by respective symbol x in center of display element 810-11) and a centroid of display element 820-9; the length of line L5 represents a distance between centroid of display element 810-15 (as depicted by respective symbol x in center of display element 810-15) and a centroid of display element 820-9; the length of line L6 represents a distance between centroid of display element 810-10 (as depicted by respective symbol x in center of display element 810-10) and a centroid of display element 820-9.

As mentioned, computer processor hardware can be configured to generate a value such as a display setting in any suitable manner. For example, the algorithm can be configured to generate the setting for display element 820-9 based on calculating a average of settings associated with nearby display elements 810-6, 810-7, 810-10, 810-11, 810-12, and 810-15. For example, assume that display element 810-6 is set to a value of 24; display element 810-7 is set to a value of 60; display element 810-10 is set to a value of 228; display element 810-11 is set to a value of −123; display element 810-12 is set to a value of −41; and display element 810-15 is set to a value of 2. The average of these values is 25. Accordingly, in this instance, the algorithm assigns the display element 820-9 a value of 25.

In accordance with further embodiments, the algorithm can be configured to generate weights for each of the display elements in the selected grouping. For example, in a non-limiting embodiment the selected algorithm to generate settings for display element 820-9 can be configured to calculate a length of each of the lines L1, L2, L3, L4, L5, and L6 and generate a corresponding weight for a respective display element depending on a length of a line. The shorter the line, the higher the magnitude of the respective weight such that the setting calculated for the display element 820-9 is more heavily weighted based on the setting of nearer elements than farther elements. As a specific example, the length of line L1 can be 7 units; the length of line L2 can be 5 units; the length of line L3 can be 6 units; the length of line L4 can be 1 unit; the length of line L5 can be 6 units; the length of line L7 can be 4 units. Based on lengths, the algorithm sets W1 for line L1 to be 0.053; the algorithm sets W2 for line L2 to be 0.157; the algorithm sets W3 for line L3 to be 0.105; the algorithm sets W4 for line L4 to be 0.368; the algorithm sets W5 for line L5 to be 0.105; the algorithm sets W6 for line L6 to be 0.21. The sum of weights can equal one. To calculate the setting for display element 820-9 based on weights, the algorithm generates the value of display element 820-9 as follows:

$$\text{Value}=(W1{\times}S1)+(W2{\times}S2)+(W3{\times}S3)+(W4{\times}S4)+(W5{\times}S5)+(W6{\times}S6);$$

where
S1=the setting of display element 810-6=24;
S2=the setting of display element 810-7=60;
S3=the setting of display element 810-10=228;
S4=the setting of display element 810-11=−123;
S5=the setting of display element 810-12=−41;
S6=the setting of display element 810-15=2.

$$\text{Value}=(0.053{\times}24)+(0.157{\times}60)+(0.105{\times}228)+(0.368{\times}(-123))+(0.105{\times}(-41))+(0.21{\times}2)=-14.2;$$

In this example instance, the algorithm assigns the setting of display element 820-9 to a value of −14.2.

In accordance with further non-limiting embodiments, the algorithm can be configured to generate weights for each of the display elements in the selected grouping according to suitable resampling kernels (such as a bilinear kernel, a bicubic kernel, a lanczos kernel, etc.). In one of such embodiments, a signal processor identifies the element 810-11 in the reference image that is closest to the coordinate location, and then selects a grouping of 16 elements comprising said element. A lookup table is available with several possible values of the kernel weights, according to the distance of the coordinate location from the centroid of element 810-11. In an embodiment, the signal processor calculates the weights by interpolating sets of weights in the lookup table corresponding to locations that are close to the actual x-distance and y-distance of the coordinate location from the centroid of element 810-11.

Accordingly, embodiments herein can include producing weighted values that vary depending on a respective distance between the centroid of the given display element as specified by the motion vector 860 and a respective centroid of an element in the grouping in the reference image; and applying the weighted values to settings of the display elements in the grouping to produce the setting for the display element 820-9.

Thus, assuming an unlimited or substantially high precision of the motion vector, embodiments herein are able to reconstruct images based on fractional movements of objects from one image plane to the next. In other words, a reference image in a sequence of multiple video frames may include a representation of an object. The reference image (at normal resolution) can be used as a basis to produce a fractionally displaced representation of the moving object in a next frame. In other words, a subsequent frame can include a rendition of the moving object in the reference frame as being moved from one frame to the next by less than a full pixel or at a sub-pixel level. In other non-limiting embodiments described in related applications, the reference image may not be a precedent or subsequent image in a sequence of images, but may instead be a support image generated specifically to support the reconstruction of multiple time-correlated images. In some of such embodiments, the reference image may even be a downblended predictor in a tiered temporal hierarchy, with a spatial resolution lower than the resolution of the motion-compensated image.

As discussed above, the motion vector 860 can specify a coordinate location other than a center of the display element 810-11 in the rendition of image 840. The motion vector 860 can be of any suitable resolution enabling the corresponding display element 820-9 to refer to any location within the rendition of image 840. Thus, the motion vector 860 can be an offset value or vector pointing to any location within a respective element or cell in the rendition of image 840 such as a reference image.

In one embodiment, the specific coordinate location (such as a location of centroid of display element 820-9) in rendition of image 840 as specified by the motion vector 860 can be offset with respect to a centroid of the display element 810-11 by a fractional value of a display element or pixel, such as a fractional value greater than zero but less than 1. As mentioned, the rendition of image 850 can include a representation of the object in reference image, but displaced by less than a full pixel with respect to the reference image.

As shown, the resolution of the rendition of image 840 such as a reference image can be substantially equal to a resolution of the rendition of image 850 (e.g., an image being rendered based at least in part on the reference image).

Note that, in accordance with further embodiments, the resolution of the rendition of image 840 can be different than the resolution of the rendition of image 850. For example, in one embodiment, the resolution of the rendition of the first image 840 can be substantially different than a resolution of the rendition of second image 850.

Accordingly, the coordinate location as specified by the motion vector 860 can be used as a basis from which to select a grouping of multiple display elements in a first image such as rendition of image 840. As mentioned, the computer processor hardware can be configured to create a grouping of multiple display elements to include display element 810-11 and one or more other display elements in the rendition of image 840, the one or more other display elements located in a vicinity of the particular display element 810-11.

In one non-limiting example embodiment, the computer processor hardware interpolates the setting of the display element 820-9 based at least in part on: i) a proximity of the coordinate location (as specified by motion vector 860) with respect to a centroid of the particular display element 810-11, ii) a setting of the particular display element 810-11, and iii) settings of the display elements located in the vicinity of the particular display element 810-11.

Note that the process of motion compensation can be applied to each of multiple elements in a compensated image to derive a rendition of image 850 based on rendition of image 840. For example, embodiments herein include generating a respective motion vector for each of multiple display elements in the rendition of image 850. In a manner as previously discussed, the computer processor hardware reproducing the rendition of image 850 utilizes the respective motion vector associated with a corresponding display element in the rendition of image 850 to identify a specific location in the rendition of image 840 to which the corresponding display element pertains. The computer processor hardware then uses the specific location as specified by the motion vector 860 as a basis in which to identify neighboring display elements in the reference image and generate a setting for the corresponding display element.

Functionality supported by the different resources will now be discussed via flowcharts in FIGS. 9-10. Note that the steps in the flowcharts below can be executed in any suitable order.

Figure 9:
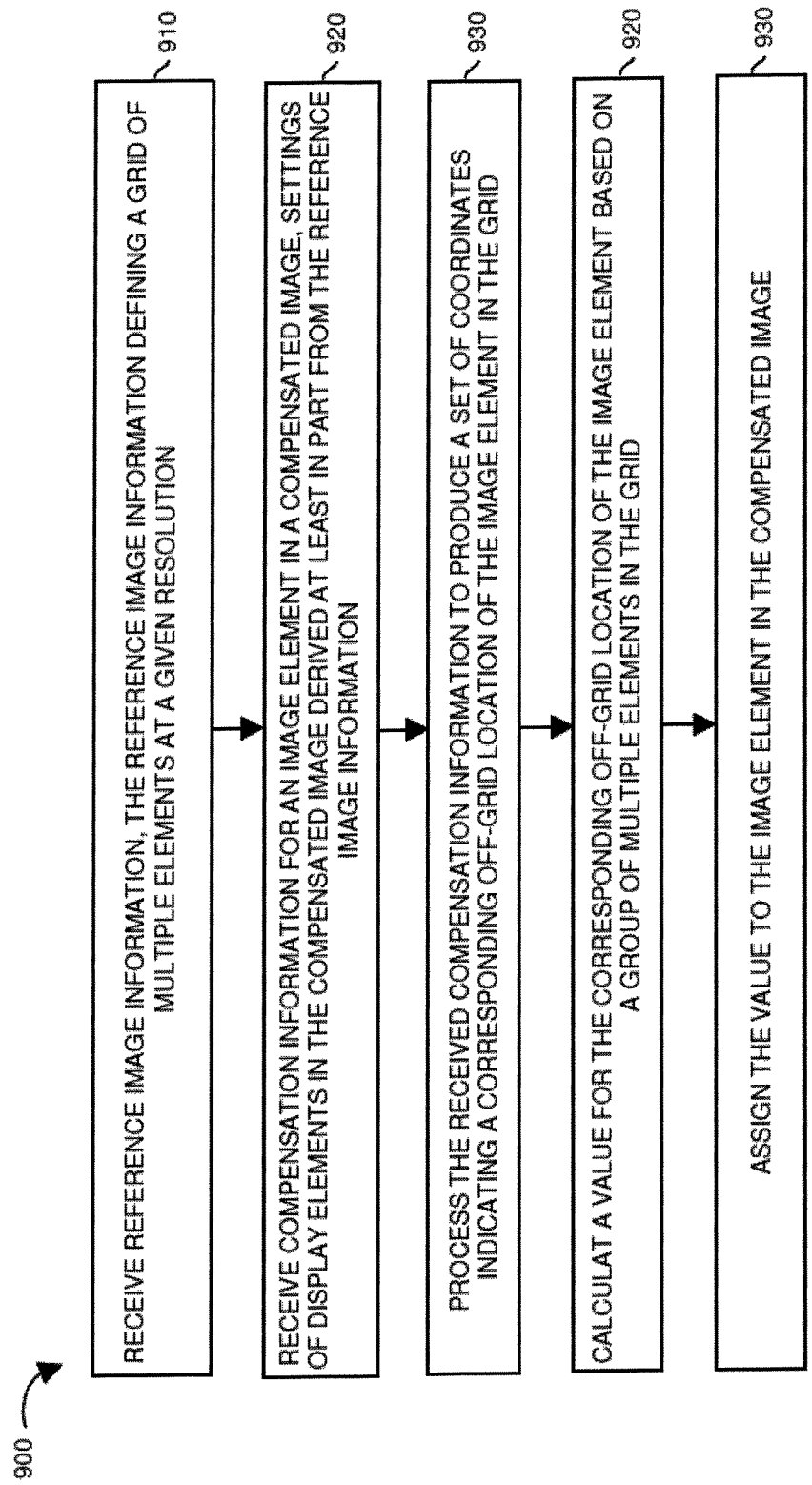

FIG. 9 is a flowchart 900 illustrating an example method according to embodiments. Note that there will be some overlap with respect to concepts as discussed above.

In processing block 910, computer processor hardware (such as decoder processing hardware) receives reference image information or reference image. The reference image information such as rendition of image 840 defines a grid of multiple elements at a given resolution.

In processing block 920, the computer processor hardware receives compensation information for an image element such as display element 820-9 in a compensated image such as rendition of image 850. The settings of display elements in the compensated image are derived at least in part from the reference image information.

In processing block 930, computer processor hardware processes the received compensation information to produce a set of coordinates such as a location as specified by the motion vector 860 indicating a corresponding off-grid location of the image element in the grid. As mentioned, the location of the display element 820-9 does not fall within grid lines, but is at least partially overlaid on multiple display elements.

In processing block 940, computer processor hardware calculates a value for the corresponding off-grid location of the image element based on a group of multiple elements in the grid.

In processing block 950, computer processor hardware assigns the calculated value to the image element in the compensated image.

FIG. 10 is a flowchart 1000 illustrating an example method according to embodiments. Note that there will be some overlap with respect to concepts as discussed above.

In processing block 1010, computer processor hardware receives settings information for a first image such as a reference image. The first image includes a set of multiple display elements.

In processing block 1020, computer processor hardware receive motion compensation information for a given display element in a second image. The motion compensation information indicates a coordinate location within a particular display element in the first image to which the given display element pertains.

In processing block 1030, computer processor hardware utilizes the coordinate location as a basis from which to select a grouping of multiple display elements in the first image.

In processing block 1040, computer processor hardware generates a setting for the given display element in the second image based on settings of the multiple display elements in the grouping.

Note again that techniques herein are well suited for encoding and decoding in hierarchical systems. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

In accordance with different embodiments, note that computer system may be any of various types of devices, including, but not limited to, a personal computer system, desktop computer, laptop, notebook, netbook computer, mainframe computer system, handheld computer, workstation, network computer, application server, storage device, a consumer electronics device such as a camera, camcorder, set top box, mobile device, smartphone, tablet, video game console, handheld video game device, a peripheral device such as a switch, modem, router, or, in general, any type of computing or electronic device.

While embodiments herein have been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
   via computer processor hardware, performing image processing operations of:
   receiving reference image information, the reference image information defining a grid of multiple elements in a reference image at a given resolution;
   receiving compensation information for an image element being reproduced in a compensated image at the given resolution, the compensated image including display elements, settings of the display elements in the compensated image derived at least in part from the reference image information;
   processing the received compensation information to produce a set of coordinates indicating a corresponding off-grid location of the image element in the grid;
   in accordance with the received compensation information, selecting a group of multiple elements in the reference image that are on-grid and that are collectively representative of the image element in the compensated image, the selected group of multiple elements disposed in proximity to the corresponding off-grid location;
   calculating a value for the corresponding off-grid location of the image element based on the selected group of multiple elements in the reference image; and
   assigning the value to the image element in the compensated image.

2. The method as in claim 1, wherein the coordinates indicating the corresponding off-grid location are expressed with a substantially higher resolution than the given resolution of the grid.

3. The method as in claim 1 further comprising:
   applying an algorithm to select which of the multiple elements in the grid to include in the group, the group of multiple elements disposed in a vicinity of the corresponding off-grid location, the algorithm applying mathematical operations to settings of the group of multiple elements to derive the value.

4. The method as in claim 1, wherein the set of coordinates indicating the corresponding off-grid location are expressed via numbers representing quantities in a real domain.

5. The method as in claim 4, wherein the set of coordinates indicating the corresponding off-grid location has a sufficiently high resolution to specify an offset with respect to on-grid locations in the grid by less than $\frac{1}{32}^{nd}$ of a display element in the grid.

6. The method as in claim 1, wherein calculating the value includes applying floating point operations in a real domain.

7. The method as in claim 1, wherein calculating the value includes applying mathematical operations with fixed-point numbers representing quantities in a real domain.

8. The method as in claim 1, wherein the compensation information comprises parameters expressed by numbers representing quantities in a real domain.

9. The method as in claim 1, wherein calculating the value includes executing a shader in a Graphics Processing Unit.

10. The method as in claim 1, wherein calculating the value includes executing at least one resampling operation.

11. The method as in claim 1, wherein processing the received compensation information includes:
    applying linear combinations to the coordinates of the image element according to parameters specified in the received compensation information to produce the set of coordinates in the reference image for the image element; and
    applying linear combinations to coordinates according to the same parameters to produce a respective set of coordinates in the reference image for each of multiple display elements in the compensated image.

12. The method as in claim 11, wherein at least one element of the multiple display elements in the compensated image with respective coordinates in the reference image is calculated based on a same set of parameters and is not contiguous with other display elements of the multiple display elements.

13. The method as in claim 1, wherein processing the received compensation information includes:
calculating a vector in homogenous coordinates corresponding to the set of coordinates associated with the image element in the compensated image; and
multiplying the vector by a matrix, wherein the coefficients in the matrix are specified at least in part based on the compensation information.

14. The method as in claim 1 further comprising:
calculating the set of coordinates as coordinates $(x^T, y^T)$, the coordinates $(x^T, y^T)$ specifying the off-grid location of the image element, the image element residing at location (x, y) in the compensated image, the coordinates $(x^T, y^T)$ calculated by performing sums and multiplications of x and y with six coefficients a, b, c, d, e and f, according to the following formula:

$$[x^T y^T] = [a \cdot x + c \cdot y + e \quad b \cdot x + d \cdot y + f].$$

15. The method as in claim 1, wherein the compensation information comprises at least one parameter selected from a group comprising: scaling, rotation and offset.

16. The method as in claim 15, wherein the compensation information comprises at least one parameter selected from the group comprising: scaling, rotation, offset, shearing, perspective change.

17. The method as in claim 1 further comprising:
calculating the set of coordinates as coordinates $(x^T, y^T)$, the coordinates $(x^T, y^T)$ specifying the off-grid location of the image element, the image element residing at location (x, y) in the compensated image, the coordinates $(x^T, y^T)$ calculated by performing sums and multiplications of x and y with eight coefficients a, b, c, d, e, f, g and h, according to the following formula:

$$[x^T \quad y^T] = \left[ \frac{a \cdot x + c \cdot y + e}{g \cdot x + h \cdot y + 1} \quad \frac{b \cdot x + d \cdot y + f}{g \cdot x + h \cdot y + 1} \right].$$

18. The method as in claim 1 further comprising:
assigning a default value to a respective set of coordinates that specify a location outside of the grid and with a distance from a closest sample of the grid beyond a given threshold value.

19. The method as in claim 1, wherein the compensated image is a two-dimensional image.

20. The method as in claim 1, wherein the compensated image is a volumetric image.

21. The method as in claim 1, wherein the compensated image is a mono-dimensional image.

22. The method as in claim 1 further comprising:
applying unique weight values to settings of the multiple elements in the group to produce the value for the corresponding off-grid location of the image element in the reference image.

23. The method as in claim 22, wherein the multiple elements in the group includes a first image element and a second image element; and
wherein applying the unique weights to settings of the multiple elements in the group includes:
applying a first weight value to a setting of the first image element; and
applying a second weight value to a setting of the second image element.

24. The method as in claim 1, wherein the multiple elements in the group includes a first image element and a second image element, the method further comprising:
multiplying a setting of the first image element by a first unique weight value;
multiplying a setting of the second image element by a second unique weight value, the first unique weight value different in magnitude than the second unique weight value.

25. The method as in claim 1, wherein each of the elements in the group are located at a different corresponding distance with respect to a centroid of the corresponding off-grid location of the image element.

26. The method as in claim 25 further comprising:
utilizing settings of each of the elements in the group to calculate the value for the corresponding off-grid location of the image element.

27. The method as in claim 1, wherein each of the elements in the group are located at a different corresponding distance with respect to a centroid of the corresponding off-grid location of the image element.

28. A method comprising:
via computer processor hardware, performing image-processing operations of:
receiving settings information for a first image, the first image being a reference image at a given grid resolution, the first image including a set of multiple display elements on a grid at the given grid resolution;
receiving motion compensation information for a given display element being reproduced in a second image at the given grid resolution, the given display element being on-grid in the second mage, the motion compensation information indicating an off-center coordinate location within a particular display element on the grid in the first image to which the given display element in the second image corresponds to;
using the received motion compensation information, selecting a group of multiple display elements in the first image that are on-grid in the reference image and that are collectively representative of the given display element in the second image, the selected group of multiple display elements disposed in proximity to the off-center coordinate location within the particular display element in the first image; and
generating a setting for the given display element in the second image based on settings of the multiple display elements in the selected group.

29. The method as in claim 28, wherein generating the setting for the given display element includes:
calculating the setting for the given display element based at least in part on distances of the multiple display elements in the grouping with respect to the off-center coordinate location in the particular display element.

30. The method as in claim 29, wherein the multiple display elements includes a first display element and a second display element, the first display element located at a first distance with respect to the off-center location, the second display element located at a second distance with respect to the off-center location, a magnitude of the first distance greater than a magnitude of the second distance.

31. The method as in claim 28, wherein generating the setting for the given display element includes:
calculating the setting for the given display element based at least in part on a settings of the multiple display elements in the grouping.

32. The method as in claim 28, wherein the off-center coordinate location represents a centroid from which to generate the setting of the given display element; and
wherein generating the setting for the given display element includes:

producing weighted values, the weighted values varying depending on a respective distance between the centroid of the given display element and a respective centroid of an element in the grouping; and
applying the weighted values to settings of the display elements in the grouping to produce the setting for the given display element.

33. The method as in claim 28, wherein utilizing the off-center coordinate location as a basis from which to select the grouping of multiple display elements in the first image includes:
creating the grouping of multiple display elements to include the particular display element and a display element in the first image located in a vicinity of the particular display element; and
interpolating the setting of the given display element based on: i) a proximity of the off-center coordinate location with respect to a centroid of the particular display element and a centroid of the display element in the vicinity of the particular display element, ii) a setting of the particular display element, and iii) a setting of the display element located in the vicinity of the particular display element.

34. The method as in claim 28,
wherein the set of multiple display elements represents at least a portion of an object present in the first image.

35. The method as in claim 28, wherein the off-center coordinate location is offset with respect to a centroid of the particular display element by a fraction of a display element greater than zero but less than 1.

36. The method as in claim 28, wherein utilizing the off-center coordinate location further comprises:
selecting the grouping of multiple display elements in the first image based on a respective nearness of each of the multiple display elements with respect to the off-center coordinate location.

37. The method as in claim 36, wherein the multiple display elements includes a first display element and a second display element; and
wherein generating the setting for the given display element in the second image further comprises:
producing a first length value, the first length value representing a respective length between the off-center coordinate location and the first display element; and
producing a second length value, the second value representing a respective length between the off-center coordinate location and the second display element.

38. The method as in claim 37, wherein generating the setting for the given display element further comprises:
deriving a first weight value based upon a magnitude of the first length value;
deriving a second weight value based upon a magnitude of the second length value;
obtaining a first setting, the first setting representing a setting of the first display element in the first image;
obtaining a second setting, the second setting representing a setting of the second display element in the first image;
multiplying the first setting by the first weight value to produce a first weighted component;
multiplying the second setting by the second weight value to produce a second weighted component; and
summing the first weighted component and the second weighted component to produce the setting for the given display element in the second image.

39. The method as in claim 28, wherein an overlay coverage region of the given display element at the off-center coordinate location in the first image overlaps at least a portion of the multiple display elements in the grouping.

40. The method as in claim 39, wherein the overlay coverage region of the given display element is offset with respect to each of the multiple display elements in the grouping.

41. The method as in claim 39, wherein at least one of the multiple display elements in the grouping resides completely outside of the overlay coverage region of the given display element in the first image.

42. The method as in claim 28, wherein the grouping of multiple display elements in the first image and the given display element in the second image represent a same portion of an object present in the first image and the second image.

43. The method as in claim 28, wherein the multiple display elements in the grouping represents a portion of an object captured in the first image; and
wherein the given display element in the second image represents the portion of the object in the second image.

44. Computer-readable hardware storage having instructions stored thereon, the instructions, when carried out by computer processor hardware, cause the computer processor hardware to:
receive reference image information, the reference image information defining a grid of multiple elements in a reference image at a given resolution;
receive compensation information for an image element being reproduced in a compensated image at the given resolution, the compensated image including display elements, settings of the display elements in the compensated image derived at least in part from the reference image information;
process the received compensation information to produce a set of coordinates indicating a corresponding off-grid location of the image element in the grid;
in accordance with the received compensation information, select a group of multiple elements in the reference image that are on-grid and that are collectively representative of the image element in the compensated image, the selected group of image elements disposed in proximity to the corresponding off-grid location;
calculate a value for the corresponding off-grid location of the image element based on a group of multiple elements in the reference image; and
assign the value to the image element in the compensated image.

45. Computer-readable hardware storage having instructions stored thereon, the instructions, when carried out by computer processor hardware, cause the computer processor hardware to:
receive settings information for a first image, the first image being a reference image at a given grid resolution, the first image including a set of multiple display elements on a grid at the given grid resolution;
receive motion compensation information for a given display element being reproduced in a second image at the given grid resolution, the given display element being on-grid in the second image, the motion compensation information indicating an off-center coordinate location within a particular display element on the grid in the first image to which the given display element in the second image corresponds to;
using the received motion compensation information, select a group of multiple display elements in the first image that are on-grid in the reference image and that are collectively representative of the given display element in the second image, the selected group of multiple display elements disposed in proximity to the off-center coordinate location within the particular display element in the first image; and generate a setting for the given display element in the second image based on settings of the multiple display elements in the selected group.

46. A computer system comprising:

computer processor hardware; and a hardware storage resource coupled to the computer processor hardware, the hardware storage resource storing instructions that, when executed by the at computer processor hardware, cause the computer processor hardware to:

receive reference image information, the reference image information defining a grid of multiple elements in a reference image at a given resolution;

receive compensation information for an image element being reproduced in a compensated image at the given resolution, the compensated image including display elements, settings of the display elements in the compensated image derived at least in part from the reference image information;

process the received compensation information to produce a set of coordinates indicating a corresponding off-grid location of the image element in the grid;

in accordance with the received compensation information, select a group of multiple elements in the reference image that are on-grid and that are collectively representative of the image element in the compensated image, the selected group of multiple elements disposed in proximity to the corresponding off-grid location;

calculate a value for the corresponding off-grid location of the image element based on the selected group of multiple elements in the reference image; and assign the value to the image element in the compensated image.

47. The computer system as in claim 46, wherein the set of coordinates indicating the corresponding off-grid location are expressed via numbers representing quantities in a real domain.

* * * * *